(12) United States Patent
Kakarla et al.

(10) Patent No.: US 8,799,075 B2
(45) Date of Patent: Aug. 5, 2014

(54) METHOD AND SYSTEM FOR PROVIDING REFINED LOCATION RELEVANT MARKETING DEVICES

(75) Inventors: Kashinath Kakarla, Bangalore (IN); Vishnu Nanda, Bangalore (IN); Sagar Dutta, Bangalore (IN); Anup P. Mutalik, Bangalore (IN)

(73) Assignee: Intuit Inc., Mountain View, CA (US)

( * ) Notice: Subject to any disclaimer, the term of this patent is extended or adjusted under 35 U.S.C. 154(b) by 206 days.

(21) Appl. No.: 13/071,357

(22) Filed: Mar. 24, 2011

(65) Prior Publication Data

US 2012/0245989 A1 Sep. 27, 2012

(51) Int. Cl.
*G06Q 30/00* (2012.01)

(52) U.S. Cl.
USPC ............... 705/14.58; 705/14.45; 704/2

(58) Field of Classification Search
CPC ..................................... G06Q 30/00
USPC ............... 705/14.58, 14.45; 704/2
See application file for complete search history.

(56) References Cited

U.S. PATENT DOCUMENTS

| | | | | |
|---|---|---|---|---|
| 7,188,800 B2 * | 3/2007 | Bessems et al. | ............... | 242/613 |
| 8,249,854 B2 * | 8/2012 | Nikitin et al. | ..................... | 704/2 |
| 2002/0035535 A1 * | 3/2002 | Brock, Sr. | ........................ | 705/37 |
| 2003/0149557 A1 | 8/2003 | Cox et al. | | |
| 2007/0061317 A1 | 3/2007 | Ramer et al. | | |
| 2007/0192294 A1 | 8/2007 | Ramer et al. | | |
| 2010/0211458 A1 * | 8/2010 | Ramer et al. | ............... | 705/14.45 |
| 2010/0250278 A1 | 9/2010 | Korman | | |
| 2010/0312572 A1 | 12/2010 | Ramer et al. | | |

OTHER PUBLICATIONS

Kakarla et al., "Method and System for Automatically Generating Event Relevant Marketing Devices," U.S. Appl. No. 13/009,705, filed Jan. 19, 2011.

* cited by examiner

*Primary Examiner* — John G Weiss
*Assistant Examiner* — Dipen Patel
(74) *Attorney, Agent, or Firm* — Hawley Troxell Ennis & Hawley LLP; Philip McKay

(57) ABSTRACT

A method and system for providing refined location relevant marketing devices whereby a marketing device management system obtains: data representing one or more marketing devices from one or more merchants; location refinement data associated with the merchants; location refinement data associated with the marketing devices; and location refinement data associated with a consumer. The marketing device management system includes a marketing device matching engine that includes a location refinement matching filter. The location refinement matching filter uses all, or part of: the location refinement data associated with the merchant; the location refinement data associated with the marketing devices; and the location refinement data associated with the consumer; to determine the marketing devices in the marketing device database most relevant to the consumer, and the consumer's current state. The most relevant marketing devices are then provided to the consumer.

32 Claims, 3 Drawing Sheets

METHOD AND SYSTEM FOR PROVIDING REFINED LOCATION RELEVANT MARKETING DEVICES

BACKGROUND

Many small business owners, such as providers of consumer products and services, and other advertisers, herein collectively referred to as "merchants", offer marketing devices, such as promotional and/or discount offers, price guarantee offers, bundled offers, coupons, and vouchers, to consumers in an effort to attract and/or encourage business.

Traditionally, marketing devices were distributed in "hardcopy", or printed, form, by various means, including, but not limited to: by mail; in newspapers; in magazines; in flyers and inserts; at store fronts and/or product displays; and/or as attachments to store receipts (i.e., printed on the back of a receipt or appended to a receipt).

More recently, marketing devices have been offered/distributed as "electronic media based marketing devices" using electronic means such as, but not limited to: networks of computing systems, including public networks such as the Internet; mobile networks and computing systems, such as smart phones; various advertising/coupon web-sites; e-mail; electronic coupon attachments to electronic receipts; and electronic coupon attachments to transactional data, such as, but not limited to, transactional data from, and/or displayed by, banks, credit card companies, and other financial institutions.

Even more recently, "mobile coupons" have become increasingly popular. Using mobile coupons, a marketing device is provided that is a type of electronic media based marketing device made available to, and/or delivered to, a consumer via a display device on one or more mobile computing systems, or other mobile devices. In many instances, once a mobile coupon is made available, or delivered, to the consumer via the display device, the mobile coupon is also presented to a seller of products and/or services, and/or is used, by displaying the mobile coupon to a merchant via the display device on the one or more mobile computing systems, or other mobile devices, or by another form of data transfer.

In addition, in many parts of the world, marketing devices, including mobile coupons, are now distributed via non-Internet based communication channels, such as communications networks supporting Short Message Service (SMS) communications and/or in SMS messages.

In order to most efficiently use their marketing and/or advertising resources, merchants, and particularly small business owners/operators, typically want to ensure their marketing devices are distributed to "real potential customers", i.e., consumers who are most likely to be motivated by the marketing device to make a purchase of a given product and/or service.

In addition, consumers typically want to ensure that any marketing devices they receive are useful to the consumer and are made available to the consumer in a timely manner, i.e., when the consumer is likely to want to use the marketing device.

One way to theoretically help ensure marketing devices are relevant to the receiving consumers is to generate and distribute marketing devices based, at least in part, on the location of the consumer and the proximity of the merchant offering the marketing device. However, location based marketing devices selected based on the physical distance between the current, or expected, location of the consumer and the merchant offering the marketing device will not necessarily yield the desired result. That is to say, location based marketing devices selected for, and distributed to, a given consumer based simply on the merchant's location being physically closest to the consumer's actual, or presumed, location, with little, or no, further analysis of the subject product or service, the consumer's current state, or the logistics of the situation/purchase, will often result in the distribution of marketing devices that are not relevant to the consumer's actual situation.

While location based marketing devices that emphasize only the physical distance between the location of the consumer and the merchant are arguably better than blindly mass distributed marketing devices, the strict, and undue, emphasis on the physical distance between the location of the consumer and the merchant offering the marketing devices is often far too simplistic an approach. Indeed, recent research has shown that merely using proximity of a consumer to a merchant as a means to filter out "relevant marketing devices" from "irrelevant marketing devices" all too often results in the distribution of irrelevant, and unwanted, marketing devices to consumers, and some likely customers not receiving relevant marketing devices.

For instance, some currently available location based marketing devices, and the current simplistic and binary methods for determining location relevancy, often ignore several other important location relevancy/refinement factors, such as, but not limited to, the type of item the consumer is looking to purchase. Recent research has found that if a consumer is looking for a durable item, such as a washing machine or a refrigerator, then marketing devices from merchants in closest neighboring areas are not particularly more relevant to that consumer than marketing devices from merchants in outlying areas and, therefore, other factors may be more useful in determining the most relevant marketing devices. However, on the contrary, if a consumer is looking for a non-durable, semi-durable, or a consumable item, such as groceries, clothing, or disposable household items, research has found that marketing devices from merchants in areas closest to the consumer are much more important and relevant to that consumer.

Another example of how some currently available location based marketing devices, and the current simplistic and binary methods for determining location relevancy, ignore other important location relevancy/refinement factors, is the fact that currently available location based marketing devices typically fail to take into account the present state of the consumer, such as whether the current location of the consumer indicates the consumer is out shopping or at home. If a consumer is not yet shopping, i.e., is at home or at work, then marketing devices from merchants in any reasonable proximity to the consumer, or even in a neighboring suburb/city, are typically relevant to that consumer. However, if the consumer is already in a shopping area, such as a mall, then marketing devices from merchants in that immediate shopping area are far more relevant to the consumer.

Another example of how some currently available location based marketing devices, and the current simplistic and binary methods for determining location relevancy, ignore other important location relevancy/refinement factors, is the fact that currently available location based marketing devices typically fail to take into account any personal data associated with the consumer themselves. For instance, assume a consumer is a woman and sends a search request for marketing devices associated with shoes. Using current methods for determining location based marketing devices, a marketing device for a men's clothing and shoe store, which happens to be the closet shoe selling merchant to the consumer who offers a marketing device, could be sent back in response to the search request. Clearly this would be an irrelevant marketing device with respect to this consumer.

Another example of how some currently available location based marketing devices, and the current simplistic and binary methods for determining location relevancy, ignore other important location relevancy/refinement factors, is the fact that currently available location based marketing devices typically fail to take into account logistical factors, such as, but not limited to, the availability of public transportation to a merchant's location, traffic between the consumer's location and merchant's location, the day of the week associated with the consumer's search and/or the terms of the marketing device, or the time of day associated with the consumer's search and/or the terms of the marketing device. However, all these factors can play an important role, if not determinative role, in assessing the relevancy of a location based marketing device to a given consumer.

As discussed above, currently available location based marketing devices, and the current simplistic and binary methods for determining location relevancy, often ignore other important location relevancy/refinement factors. As a result, currently, many marketing devices are distributed to consumers that have no real interest in the marketing devices and many consumers who would have interest in marketing devices do not receive the most relevant marketing devices. This is clearly not ideal for either the merchants associated with the marketing devices or the consumers. In addition, the situation described above has the potential to cause a consumer, who is tired of receiving irrelevant marketing devices, to unsubscribe and leave the marketing device management and distribution system altogether; again this is not a good result for either the merchants associated with the marketing devices or the consumers.

SUMMARY

In accordance with one embodiment, a method and system for providing refined location relevant marketing devices includes a process for providing refined location relevant marketing devices whereby, in one embodiment, a marketing device management system obtains data representing one or more marketing devices from one or more merchants. In one embodiment, a merchant providing a marketing device is initially asked to provide location refinement data associated with the merchant, such as, but not limited to, the merchant's location, the merchant's hours of operation, the merchant's shipping policies, and/or the merchant's service policies and capabilities. In one embodiment, the location refinement data associated with the merchants is used to create, or supplement, merchant profiles for each of the merchants.

In one embodiment, the data representing the marketing devices is analyzed to determine location refinement data associated with the marketing devices such as, but not limited to, the products and/or services that are the subject of the marketing device, and/or the terms of the marketing device. In one embodiment, the data representing the marketing devices, and therefore the marketing devices, are categorized and stored in a marketing device database.

In one embodiment, when a consumer subscribes to the marketing device management system, the consumer is asked to provide location refinement data associated with the consumer, such as, but not limited to, the consumer's home address, the consumer's work address, and/or to provide access to data associated with the consumer from one or more data management systems associated with the consumer. In one embodiment, location refinement data associated with the consumer is used to create, or supplement, a consumer profile for the consumer.

In one embodiment, when a consumer makes a request to the marketing device management system for marketing devices associated with a given product or service, current location refinement data associated with the consumer is obtained such as, but not limited to, the consumer's present location.

In one embodiment, the marketing device management system includes a marketing device matching engine that includes a location refinement matching filter. When the consumer makes the request to the marketing device management system for marketing devices associated with a given product or service, the location refinement matching filter uses all, or part, of: the marketing device request data; the obtained location refinement data associated with the merchant, and/or the merchant's profile data; the obtained location refinement data associated with the marketing devices; the obtained location refinement data associated with the consumer, and/or the consumer's profile data; and the obtained current location refinement data associated with the consumer, to determine the marketing devices in the marketing device database most relevant to the consumer, and the consumer's current state.

In one embodiment, the data representing the most relevant marketing devices is then provided to the consumer.

Using the method and system for providing refined location relevant marketing devices, as discussed herein, a refined, and more accurate, system and method for determining location relevancy of marketing devices to a given consumer is provided that takes into account many important location relevancy/refinement factors that the current simplistic and binary methods for determining location relevancy often ignore. As a result, using the method and system for providing refined location relevant marketing devices, as discussed herein, marketing devices are distributed to consumers that are far more likely to be of relevance to the consumers, and therefore are far more likely to be used by the consumers. Therefore, both merchants and consumers are benefitting by the use of the method and system for providing refined location relevant marketing devices, as discussed herein.

As discussed in more detail below, using the below embodiments, with little or no modification and/or user/consumer input, there is considerable flexibility, adaptability, and opportunity for customization to meet the specific needs of various users/consumers under numerous circumstances.

Figure 1:
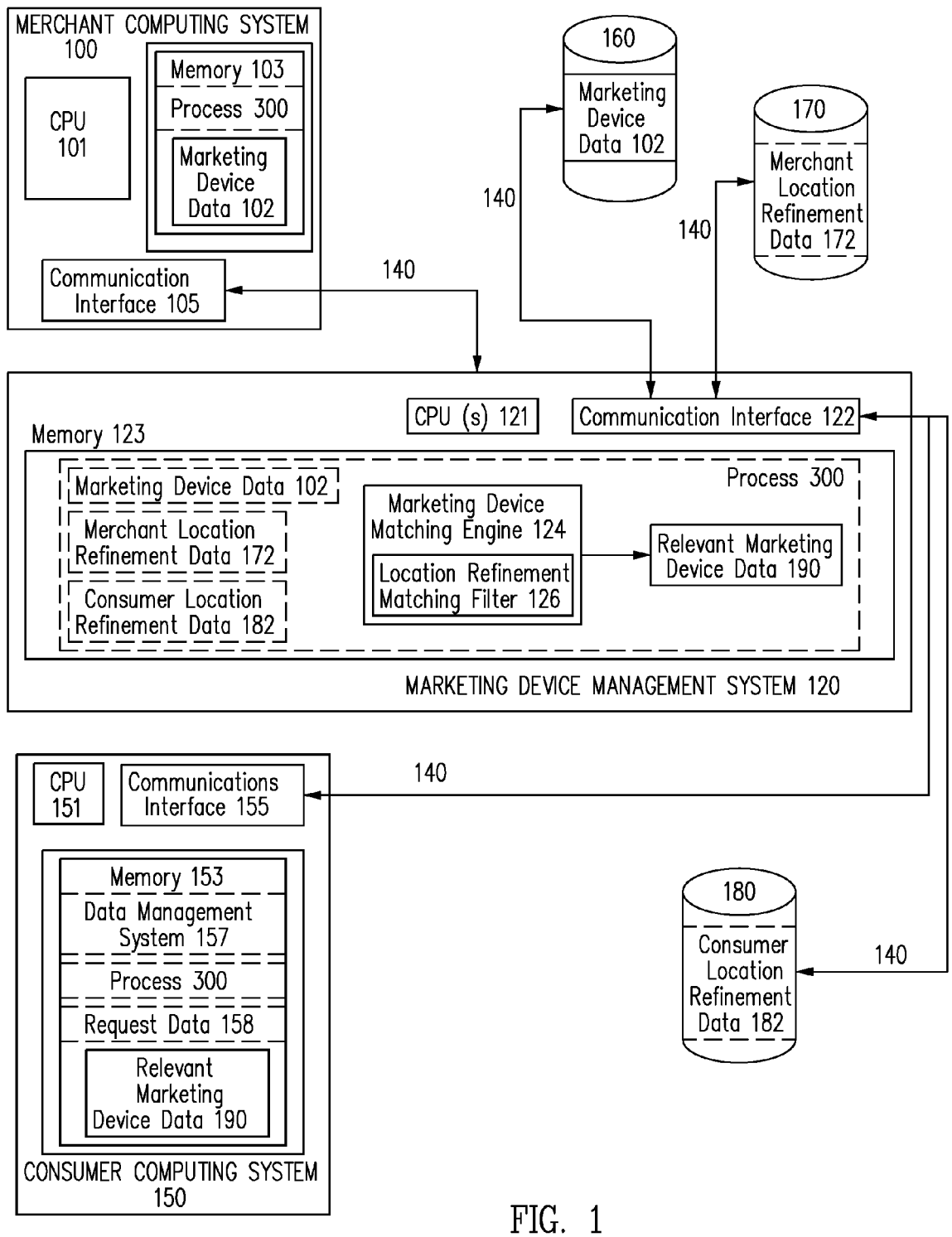
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing refined location relevant marketing devices includes a process for providing refined location relevant marketing devices whereby, in one embodiment, a marketing device management system obtains data representing one or more marketing devices from one or more merchants.

In one embodiment, at least part of the data representing one or more marketing devices is obtained from the merchants offering the marketing devices. In one embodiment, at least part of the data representing one or more marketing devices is obtained from the merchants via one or more computing systems. In one embodiment, at least part of the data representing one or more marketing devices is obtained from merchants via one or more mobile computing systems, such as a mobile phone. In one embodiment, at least part of the data representing one or more marketing devices is obtained from merchants via a Short Message Service (SMS) message sent via an SMS capable communications network and an SMS capable system. In one embodiment, at least part of the data representing one or more marketing devices is obtained from merchants via a user interface display and designated text fields and/or in a designated text format.

In one embodiment, at least part of the data representing one or more marketing devices is obtained using any means, method, process, and/or procedure, and/or any combination of means, methods, processes, and/or procedures, of obtaining data, as discussed herein, and/or as known in the art at the time of filing, and/or as developed after the time of filing.

In one embodiment, the data representing one or more marketing devices includes, but is not limited to, any one or more of: the name of the merchant and/or the merchant's business; the location of the merchant and/or the merchant's business; the products sold by the merchant and/or the merchant's business; the services provided by the merchant and/or the merchant's business; the products and/or services that are the subject of the marketing devices; the terms of the marketing devices, such as discount, price, bundled products, etc.; any conditions of the marketing devices, i.e., expiration dates, restrictions on use, bundled products, etc.; and/or any other marketing device data the merchant desires to provide and/or is required by the provider of the process for providing refined location relevant marketing devices.

In one embodiment, the data representing the marketing devices is analyzed to determine location refinement data associated with the marketing devices such as, but not limited to the products and/or services that are the subject of the marketing device, and/or the terms of the marketing device.

In one embodiment, the data representing the marketing devices, and therefore the marketing devices, and/or the location refinement data associated with the marketing devices, is categorized and stored in a marketing device database.

In one embodiment, merchants providing marketing device data are initially asked to provide merchant location refinement data to be associated with the merchants, such as, but not limited to: the name of the merchant and/or the merchant's business; the location of the merchant and/or the merchant's business; the products sold by the merchant and/or the merchant's business; the services provided by the merchant and/or the merchant's business; all the merchant's location(s); the merchant's hours of operation; the merchants' contact information, such as e-mail, web page, social media accounts, phone number etc.; the merchant's shipping policies; proximity of the merchant's location to public transportation; and/or the merchant's service policies and capabilities. In one embodiment, this location refinement data associated with the merchant is used to create, or supplement, merchant profiles for each of the merchants.

In one embodiment, the merchant location refinement data, and/or the merchant profile data, is categorized and stored in a merchant location refinement database.

In one embodiment, a consumer desiring to utilize the marketing device management system to search for, and obtain, marketing devices is requested to provide consumer profile data, at least part of which is to be used as consumer location refinement data.

In various embodiments, the consumer location refinement data includes, but is not limited to: the consumer's home address; the consumer's work address; the consumer's shopping likes and dislikes; the consumer's shopping history, including transaction history; the consumer's age; the consumer's occupation; the consumer's sex; the consumer's marital status and/or number of dependents; when and where the consumer prefers to shop; and/or any other personal and/or demographic data associated with the consumer that is desired by the provider of the marketing device management system, and/or the process for providing refined location relevant marketing devices.

In one embodiment, the consumer location refinement data is obtained from any one or more of, but not limited to: the consumers themselves; computing systems associated with the consumers; mobile computing systems associated with the consumers; data collected by monitoring a consumers historical usage of marketing devices, including location relevant marketing devices; and/or any other source of consumer data, or combination of sources of consumer data, as discussed herein, and/or as known in the art at the time of filing, and/or as developed after the time of filing.

In one embodiment, the consumer location refinement data is provided to the marketing device management system, and/or the process for providing refined location relevant marketing devices, by the consumer providing the process for providing refined location relevant marketing devices access to data from one or more data management systems associated with the consumer.

Types of data management systems currently available include, but are not limited to any of the following: an on-line, or web-based, or computing system implemented, personal financial management system, package, program, module, or application; an on-line, or web-based, or computing system implemented, calendar and/or appointment system, package, program, module, or application; an on-line, or web-based, or computing system implemented personal or business contacts management system, package, program, module, or application; on-line, or web-based, or computing system implemented, personal or business tax preparation and/or management system, package, program, module, or application, or any of the data management systems as discussed herein, and/or as known in the art at the time of filing, and/or as developed after the time of filing.

In one embodiment, the consumer location refinement data associated with the consumers is used to create, or supplement, a consumer profile for each consumer.

In one embodiment, the consumer location refinement data, and/or the consumer profile data, is categorized and stored in a consumer database.

In one embodiment, a consumer makes a request to the marketing device management system for marketing devices associated with a desired product or service.

In one embodiment, the consumer makes the request to the marketing device management system for marketing devices associated with the desired product or service using a consumer computing system associated with, and/or accessible by, the consumer.

Herein, the term "computing system" includes, any computing system discussed herein, and/or as known in the art at the time of filing, and/or as developed after the time of filing, such as, but not limited to: any mobile computing system, such as a mobile phone, a smart phone, an internet appliance, any SMS capable system, or any other mobile computing system as discussed herein, and/or as known in the art at the time of filing, and/or as developed after the time of filing; any desktop computing system; any laptop computing system; any notebook computing system; any workstation; a two-way pager; a Personal Digital Assistant (PDA); a server computer, any other device, or any desired combination of these devices, that includes components that can execute all, or part, of process for a providing refined location relevant marketing devices in accordance with at least one of the embodiments as described herein.

In one embodiment, when a consumer makes a request to the marketing device management system for marketing devices associated with a desired product or service, current location refinement data associated with the consumer is obtained such as, but not limited to, the consumer's present location, or a location desirable, and/or otherwise to/designated by, the consumer.

In one embodiment, the consumer's current location refinement data is obtained from the consumer via manual input from the consumer thru one or more consumer computing systems.

In one embodiment, the consumer's current location refinement data is obtained automatically, or semi-automatically, upon consumer approval, from the one or more consumer computing systems, and a Global Positioning Satellite (GPS) capability, or any similar location tracking capability, associated with the one or more consumer computing systems.

In one embodiment, the consumer's current location refinement data is obtained using any method, mechanism, process, procedure, or device for obtaining data indicating a consumer's current location, projected location, or a desired location, as discussed herein, and/or as known in the art at the time of filing, and/or as developed after the time of filing.

In one embodiment, the marketing device management system includes a marketing device matching engine that includes a location refinement matching filter. In one embodiment, the location refinement matching filter uses all, or part of: the data indicating the consumer request for marketing devices and/or the type of product and/or service of interest to the consumer; the obtained merchant location refinement data associated with the merchant, and/or the merchant's profile data; the obtained marketing device location refinement data associated with the marketing devices; the obtained consumer location refinement data associated with the consumer, and/or the consumer's profile data; and the obtained consumer current location refinement data associated with the consumer, to determine/match the marketing devices in the marketing device database most relevant to the consumer, and the consumer's current state.

In one embodiment, the marketing device management system includes a marketing device matching engine that includes a location refinement matching filter. In one embodiment, the location refinement matching filter uses all, or part of: the data indicating the consumer request for marketing devices and/or the type of product and/or service of interest to the consumer; the obtained merchant location refinement data associated with the merchant, and/or the merchant's profile data; the obtained marketing device location refinement data associated with the marketing devices; the obtained consumer location refinement data associated with the consumer, and/or the consumer's profile data; and the obtained consumer current location refinement data associated with the consumer, to calculate a location relevancy score to be associated with the marketing devices.

In one embodiment, the location relevancy score is used, at least in part, to determine/match the marketing devices in the marketing device database most relevant to the consumer, and the consumer's current state.

In one embodiment, the marketing device matching engine uses one or more processes to match one or more marketing devices in the marketing device database to the consumer's marketing device request and the consumer's current state. In some embodiments, these processes define, and/or use, weighting factors, and/or other methods, to emphasize one or more location refinement parameters associated with the consumer's marketing device request and the consumer's current state.

As a specific illustrative example, in one embodiment, the marketing device matching engine employs a matching process wherein location refinement factors are defined and assigned numerical values.

In this specific example, the location refinement factors are $L1$, $L2$, and $L3$. In this specific example, $L1$ is defined to be the physical distance between the consumer's position, as obtained from the consumer's current location refinement data, and the position of merchants associated with the marketing devices, as obtained from the marketing devices' location refinement data, and/or the merchants' location refinement data.

In this specific example, the value for $L1$ is assigned a numerical value as follows: $L1=3$, if the consumer and the merchant are within the same 1 to 2 square mile area; $L1=2$, if they are in the same suburb or zip code; and $L1=1$ if within the same city or area code.

In this specific example, $L2$ is defined to be any location-enhancing marketing device terms associated with marketing device, as obtained from the marketing devices' location refinement data, and/or the merchants' location refinement data, such as, but not limited to: free home delivery; free demo at home; free installation; and any location-enhancing terms that may enhance/refine the location relevancy of the offer.

In this specific example, the value for $L2$ is assigned a numerical value as follows: $L2=3$, if there are two or more location enhancers for both decision making and purchase; $L2=2$, if there is one location enhancer in the offer; $L2=1$, if none exist.

In this specific example, $L3$ is defined to be any commute refinement factors that refine a purely distance based analysis such as, but not limited to: the presence of good public transport connections to the merchant; shopping area where the merchant is located; expected traffic between the consumer's position and merchants' position; whether the consumer is currently at home or work, or out and about; the time of day the consumer is making the marketing device request; the day of the week the consumer is making the marketing device request; whether the merchants' locations are at, or near, locations the consumer has historically frequented and/or shopped; etc.

In this specific example, the value for L3 is assigned a numerical value as follows: L3=2, if two or more commute refinement factors are present/positive; L3=1, if one commute refinement factor is present/positive; L3=0, if no commute refinement factor is present/positive; L3=−1, if one commute refinement factor is negative; and L3=−2, if two or more commute refinement factors are negative.

In this specific illustrative example, the category of the product and/or service associated with the consumer's current marketing device search request is not only used to filter the marketing device search, but a category is assigned to the product and/or service and the category is used to define/determine category weighting factors to be assigned to the location refinement factors L1, L2, and L3.

For instance, in one specific example, the category weighting factors include three different values that are assigned to the location refinement factors L1, L2, and L3 as follows: a category weighting factor C1 assigned to location refinement factor L1; a category weighting factor C2 assigned to location refinement factor L2; and a category weighting factor C3 assigned to location refinement factor L3.

Consequently, in this specific illustrative example, a location relevancy score (LRS) for a marketing device is calculated as the sum:

$$L1(C1)+L2(C2)+L3(C3)=LRS.$$

In various applications, the category weighting factors are based on the type of product and/or service associated with the consumer's marketing device request and whether the type of product and/or service is a "durable" product, or a "non-durable."

As discussed above, recent research has found that if a consumer is looking for a durable item, such as a washing machine or a refrigerator, then marketing devices from merchants in closest neighboring areas are not particularly more relevant to that consumer than marketing devices from merchants in outlying areas and, therefore, other factors may be more useful in determining the most relevant marketing devices. However, on the contrary, if a consumer is looking for a non-durable, semi-durable, or a consumable item, such as groceries, clothing, or disposable household items, research has found that marketing devices from merchants in areas closest to the consumer really do tend to be much more important and relevant to that consumer.

In light of this research, in one example, if the type of product and/or service is categorized as a "durable" product, i.e., has the associated category of durable good then: the category weighting factor C1 assigned to location refinement factor L1 (physical distance) might be given a relatively low value, or fractional value, such as 0.5, thereby reflecting the relative unimportance of physical distance when durable goods are involved; the category weighting factor C2 assigned to location refinement factor L2 (location-enhancing marketing device terms) might be given a relatively high value, such as 1.5, thereby reflecting the relative importance of service, delivery charges, and installation, when durable goods are involved; and a category weighting factor C3 assigned to location refinement factor L3 (commute refinement factors) might be given a relatively neutral value such as 1.0, thereby reflecting the relative importance of commute refinement factors, such as available public transportation when durable goods are involved.

Consequently, in this specific illustrative example, a location relevancy score (LRS) for a marketing device associated with a durable good is calculated as the sum:

$$L1(0.5)+L2(1.5)+L3(1.0)=LRS.$$

On the other hand, in one example, if the type of product and/or service is a "non-durable" product, i.e., has the associated category of non-durable good then: the category weighting factor C1 assigned to location refinement factor L1 (physical distance) might be given a relatively high value, such as 1.5, thereby reflecting the relative importance of physical distance when non-durable goods are involved; the category weighting factor C2 assigned to location refinement factor L2 (location-enhancing marketing device terms) might be given a relatively low value, such as 0, thereby reflecting the relative unimportance, or irrelevance, of service, delivery charges, and installation, when non-durable goods are involved; and a category weighting factor C3 assigned to location refinement factor L3 (commute refinement factors) might be given a relatively neutral value such as 1.0, thereby reflecting the relative importance of commute refinement factors, such as available public transportation, when non-durable goods are involved.

Consequently, in this specific illustrative example, a location relevancy score (LRS) for a marketing device associated with a non-durable good is calculated as the sum:

$$L1(1.5)+L2(0)+L3(1.0)=LRS.$$

In one embodiment, the weighted summation, or location relevancy score (LRS), associated with the marketing devices is used to reflect a refined consideration of "functional" distance between the merchant offering the marketing device and the consumer that takes into consideration not only physical distance between the merchant offering the marketing device and the consumer (L1) but also the type of product and/or service being sought (C1, C2, and C2), the current state of the consumer (L2, L3), and various other relevancy and logistical factors (L2), that are largely ignored by currently available methods and systems. In one embodiment, this calculation is then used by the location refinement matching filter and the marketing device matching engine to match the most relevant one or more marketing devices in the marketing device database to the consumer's marketing device request and the consumer's current state.

In one embodiment, data representing the matched most relevant one or more marketing devices is distributed to the consumer via one or more computing systems associated with the consumer.

In one embodiment, the data representing the matched most relevant one or more marketing devices is distributed to the consumer via one or more mobile computing systems, such as mobile phones, associated with the consumer.

In one embodiment, the data representing the matched most relevant one or more marketing devices is distributed to the consumer via one or more Short Message Service (SMS) messages sent via one or more SMS capable communications networks and one or more SMS capable systems associated with the consumer.

In one embodiment, the data representing the matched most relevant one or more marketing devices is distributed to the consumer via any method, means, mechanism, process, procedure, or device for distributing data as discussed herein, and/or as known in the art at the time of filing, and/or as developed after the time of filing.

Hardware System Architecture

FIG. 1 is a block diagram of an exemplary hardware architecture for implementing one embodiment of a system and method for providing refined location relevant marketing devices, such as exemplary process 300, discussed herein, that includes: a merchant computing system 100, e.g., a first computing system; a consumer computing system 150, e.g., a second computing system; a marketing device management system 120, e.g., a third computing system; a marketing device database 160, e.g., a first database, including marketing device data 102; a merchant database 170, e.g., a second database, including merchant location refinement data 172; a consumer database 180, e.g., a third database, including consumer location refinement data 182; and various communications links 140.

As seen in FIG. 1, merchant computing system 100 typically includes a central processing unit (CPU) 101, communication interface 105, and a memory system 103. In one embodiment, memory system 103 includes all, or part of, a process for providing refined location relevant marketing devices 300. In one embodiment, process for providing refined location relevant marketing devices 300 is stored, in whole, or in part, in memory system 103.

In one embodiment, memory system 103 includes all, or part of, marketing device data 102. In one embodiment, marketing device data 102 includes, but is not limited to, any one or more of: marketing device location refinement data; the name of the merchant and/or the merchant's business; the location of the merchant and/or the merchant's business; the products sold by the merchant and/or the merchant's business; the services provided by the merchant and/or the merchant's business; the products and/or services that are the subject of the marketing devices; the terms of the marketing devices, such as discount, price, bundled products, etc.; any conditions of the marketing devices, i.e., expiration dates, restrictions on use, bundled products, etc.; and/or any other marketing device data the merchant desires to provide and/or is required by the provider of the process for providing refined location relevant marketing devices.

Merchant computing system 100 may further include standard consumer interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, merchant computing system 100, whether available or known at the time of filing or as later developed.

In one embodiment, process for providing refined location relevant marketing devices 300 is entered, in whole, or in part, into merchant computing system 100 via an I/O device (not shown), such as from a CD, DVD, floppy disk, portable hard drive, memory stick, download site, or other medium and/or computer program product as defined herein.

In one embodiment, merchant computing system 100 is any computing system discussed herein, and/or as known in the art at the time of filing, and/or as developed after the time of filing.

As also seen in FIG. 1, marketing device database 160 includes marketing device data 102. As noted above, in one embodiment, marketing device data 102 includes, but is not limited to, any one or more of: marketing device location refinement data; the name of the merchant and/or the merchant's business; the location of the merchant and/or the merchant's business; the products sold by the merchant and/or the merchant's business; the services provided by the merchant and/or the merchant's business; the products and/or services that are the subject of the marketing devices; the terms of the marketing devices, such as discount, price, bundled products, etc.; any conditions of the marketing devices, i.e., expiration dates, restrictions on use, bundled products, etc.; and/or any other marketing device data the merchant desires to provide and/or is required by the provider of the process for providing refined location relevant marketing devices.

As also seen in FIG. 1, merchant database 170 includes merchant location refinement data 172. In one embodiment, merchant location refinement data 172 includes, but is not limited to: merchant profile data; the name of the merchant and/or the merchant's business; the location of the merchant and/or the merchant's business; the products sold by the merchant and/or the merchant's business; the services provided by the merchant and/or the merchant's business; all the merchant's location(s); the merchant's hours of operation; the merchants' contact information, such as e-mail, web page, social media accounts, phone number etc.; the merchant's shipping policies; proximity of the merchant's location to public transportation; and/or the merchant's service policies and capabilities.

As also seen in FIG. 1, consumer database 180 includes consumer location refinement data 182. In one embodiment, consumer location refinement data includes, but is not limited to: consumer profile data; current consumer location refinement data; the consumer's home address; the consumer's work address; the consumer's shopping likes and dislikes; the consumer's shopping history, including transaction history; the consumer's age; the consumer's occupation; the consumer's sex; the consumer's marital status and/or number of dependents; when and where the consumer prefers to shop; and/or any other personal and/or demographic data associated with the consumer that is desired by the provider of the marketing device management system, and/or the process for providing refined location relevant marketing devices.

In various embodiments, any, or all, of marketing device database 160, merchant database 170, and consumer database 180 can be a data storage devices, a designated server system or computing system, or a designated portion of one or more server systems or computing systems, such as computing systems 100, 150 and 120, or a distributed database, or an external and/or portable hard drive. In one embodiment, any, or all, of marketing device database 160, merchant database 170, and consumer database 180 can be a dedicated mass storage device implemented in software, hardware, or a combination of hardware and software. In one embodiment, any, or all, of marketing device database 160, merchant database 170, and consumer database 180 can be a web-based function.

As discussed in more detail below, in one embodiment, any, or all, of marketing device database 160, merchant database 170, and consumer database 180, can be under the control of a process for providing refined location relevant marketing devices, such as exemplary process 300.

In one embodiment, marketing device management system 120 includes one or more system processors CPU(s) 121, a communication interface 122 and a memory 123.

As seen in FIG. 1, in one embodiment, memory 123 includes all, or part of, process for providing refined location relevant marketing devices 300.

As seen in FIG. 1, in one embodiment, memory 123, and/or process for providing refined location relevant marketing devices 300 include: at least part of marketing device data 102 from merchant computing system 100 and/or marketing device database 160; at least part of merchant location refinement data 172 from merchant computing system 100 and/or merchant database 170; and at least part of consumer location refinement data from consumer computing system 150 and/or consumer database 180.

As seen in FIG. 1, in one embodiment, memory 123, and/or process for providing refined location relevant marketing devices 300 includes marketing device matching engine 124 and location refinement matching filter 126.

In one embodiment, marketing device matching engine 124 and location refinement matching filter 126 are used, under the direction of one or more processors, such as CPU(s) 121, to match one or more marketing devices in marketing device database 160 to a request for marketing devices from a consumer through consumer computing system 150, and the current state of the consumer.

In one embodiment, location refinement matching filter 126 uses all, or part of: the data indicating the consumer request for marketing devices and/or the type of product and/or service of interest to the consumer; merchant location refinement data 172; marketing device data 102; and consumer location refinement data 182, including consumer current location refinement data associated with the consumer, to determine/match the marketing devices in marketing device database 160 most relevant to the consumer, and the consumer's current state.

In one embodiment, marketing device matching engine 124 uses one or more processes to match one or more relevant marketing devices 190 in marketing device database 160 to the consumer's marketing device request and the consumer's current state. In some embodiments, these processes define, and/or use, weighting factors, and/or other methods, to emphasize one or more location refinement parameters associated with the consumer's marketing device request and the consumer's current state.

In one embodiment, marketing device matching engine 124 is also used to automatically generate relevant marketing device data 190 representing at least one relevant marketing device that includes at least part of the matched marketing device data 102.

In one embodiment, marketing device management system 120 is used as a distribution means for distributing one or more marketing devices, represented by relevant marketing device data 190, to one or more consumers, and/or consumer computing systems 150.

In various embodiments, marketing device management system 120 is any computing system discussed herein, and/or as known in the art at the time of filing, and/or as developed after the time of filing.

As also seen in FIG. 1, consumer computing system 150 typically includes a central processing unit (CPU) 151, a communications interface 155, and a memory system 153. In one embodiment, memory system 153 includes all, or part of, process for providing refined location relevant marketing devices 300. In one embodiment, process for providing refined location relevant marketing devices 300 is stored, in whole, or in part, in memory system 153.

In one embodiment, memory system 153 includes one or more data management systems 157, such as any of the data management systems as discussed herein, and/or as known in the art at the time of filing, and/or as developed after the time of filing.

In one embodiment, memory system 153 includes marketing device request data 158 representing one or more requests made by a consumer, through consumer computing system 150, to marketing device management system 120 for marketing devices.

In one embodiment, memory system 153 includes all, or part of, relevant marketing device data 190 representing one or more relevant marketing devices generated by process for providing refined location relevant marketing devices 300 and sent to consumer computing system 150.

Consumer computing system 150 may further include standard consumer interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other device capable of inputting data to, and outputting data from, consumer computing system 150, whether available or known at the time of filing or as later developed.

In one embodiment, process for providing refined location relevant marketing devices 300 is entered, in whole, or in part, into consumer computing system 150 via an I/O device (not shown), such as from a CD, DVD, floppy disk, portable hard drive, memory stick, download site, or other medium and/or computer program product as defined herein.

In one embodiment, consumer computing system 150 is any computing system discussed herein, and/or as known in the art at the time of filing, and/or as developed after the time of filing.

In one embodiment, computing systems 100, 120, and 150 and databases 160, 170 and 180, are linked together via communications channels 140. In various embodiments, any, or all, of communications channels 140 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In various embodiments, any, or all, of communications channels 140 can be any SMS communication link as discussed herein, and/or as known in the art at the time of filing, and/or as developed after the time of filing. Short Message Service (SMS) is the text communication service component of phone, web, or mobile communication systems. SMS uses relatively ridged standardized communications protocols that allow the exchange of only very short text messages between fixed line or mobile phone devices.

In one embodiment, computing systems 100, 120 and 150, and databases 160, 170, and 180, are part of a cloud computing environment.

Those of skill in the art will readily recognize that the components shown in FIG. 1, and their respective sub-components, are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100, 120 and 150, and databases 160, 170, and 180, are not relevant.

Figure 2:
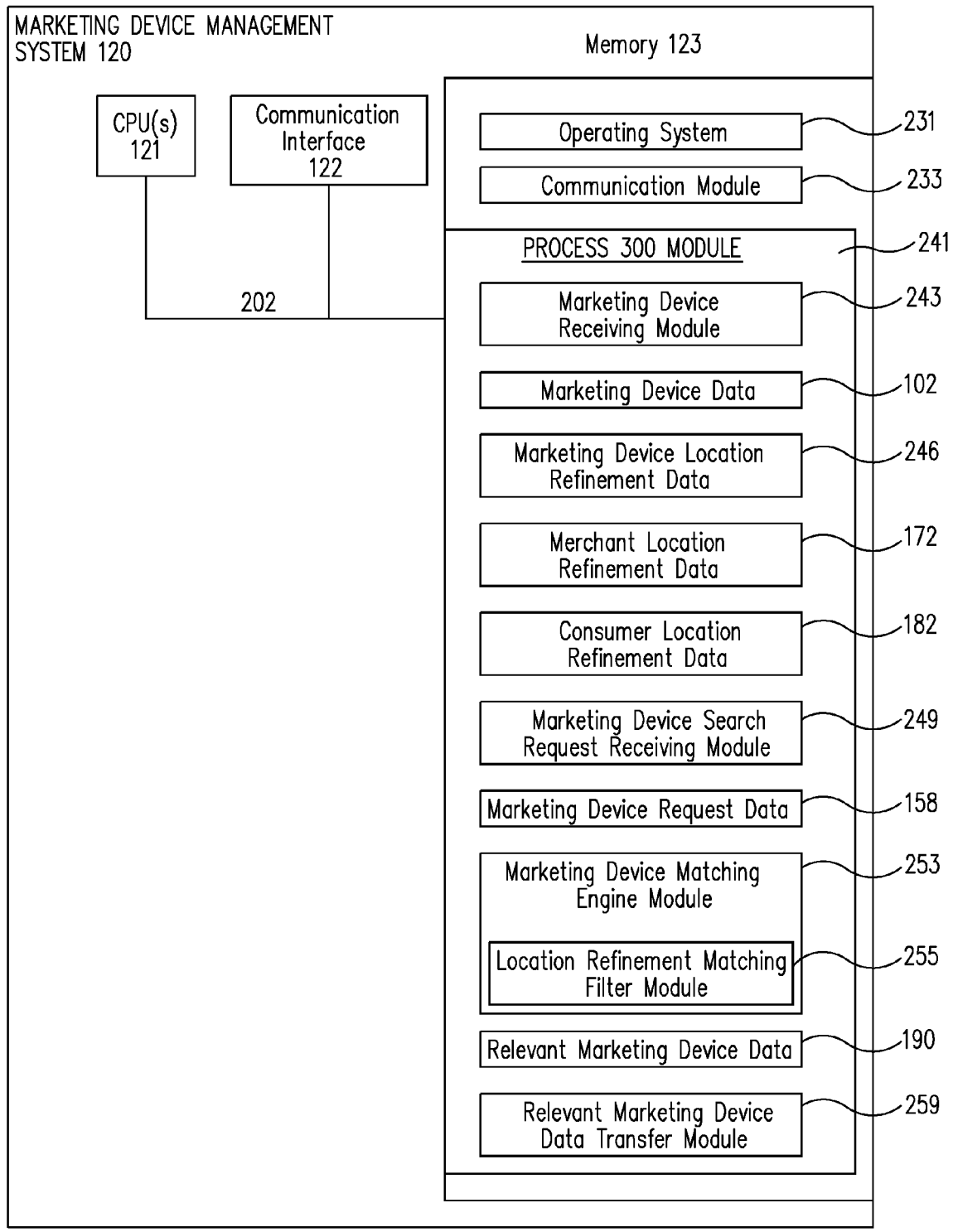
FIG. 2 is a more detailed block diagram of a marketing device management system in accordance with one embodiment.

FIG. 2 is a more detailed block diagram of a marketing device management system 120. As seen in FIG. 2, in one embodiment, marketing device management system 120 includes one or more Central Processing Unit(s), CPU(s) 121; memory 123; and at least one communication interface 122; all interconnected by one or more communication buses 202.

As also seen in FIG. 2, in one embodiment, memory 123 can store data and/or instructions associated with, but not limited to, the following elements, subsets of elements, and/or super sets of elements for processing by one or more processors, such as CPU(s) 121: operating system 231 that includes procedures, data, and/or instructions for handling various services and performing/coordinating hardware dependent tasks; network communications module 233 that includes procedures, data, and/or instructions, for, along with communication interface 122, connecting marketing device management system 120 to other computing systems, such as user computing system(s) 100, and/or one or more communications channels, such as communications channels 140 of FIG. 1, and/or one or more databases, such as databases 160, 170, and 180 of FIG. 1; process 300 module 241 (FIG. 2) that includes procedures, data, and/or instructions, for implementing and operating at least part of a process for providing refined location relevant marketing devices 300.

As also seen in FIG. 2, in one embodiment, process 300 module 241 (FIG. 2) of memory 123 includes marketing device receiving module 243 that includes procedures, data, and/or instructions for receiving and analyzing marketing devices from either a merchant or a marketing device database, such as marketing device database 160 of FIG. 1.

As also seen in FIG. 2, in one embodiment, process 300 module 241 (FIG. 2) of memory 123 includes marketing device data 102 that includes marketing device data from marketing device receiving module 243.

As also seen in FIG. 2, in one embodiment, process 300 module 241 (FIG. 2) of memory 123 includes marketing device location refinement data 246 that includes procedures, data, and/or instructions associated with determining and processing marketing device location refinement data from marketing device data 102.

As also seen in FIG. 2, in one embodiment, process 300 module 241 (FIG. 2) of memory 123 includes merchant location refinement data 172 obtained from either merchant computing system 100 or merchant database 160 of FIG. 1.

As also seen in FIG. 2, in one embodiment, process 300 module 241 (FIG. 2) of memory 123 includes consumer location refinement data 182 obtained from either consumer computing system 150 or consumer database 170 of FIG. 1.

As also seen in FIG. 2, in one embodiment, process 300 module 241 (FIG. 2) of memory 123 includes marketing device search request receiving module 249 that includes procedures, data, and/or instructions associated with receiving and/or processing marketing device request data 158 representing one or more requests made by a consumer, through consumer computing system 150 (FIG. 1), to marketing device management system 120 for marketing devices.

As also seen in FIG. 2, in one embodiment, process 300 module 241 (FIG. 2) of memory 123 includes marketing device request data 158 from marketing device search request receiving module 249.

As also seen in FIG. 2, in one embodiment, process 300 module 241 (FIG. 2) of memory 123 includes marketing device matching engine module 253 that includes procedures, data, and/or instructions associated with implementing and operating a marketing device matching engine in the manner discussed herein.

As also seen in FIG. 2, in one embodiment, marketing device matching engine module 253 includes location refinement matching filter module 255 that includes procedures, data, and/or instructions associated with implementing and operating a location refinement matching filter in the manner discussed herein.

As also seen in FIG. 2, in one embodiment, process 300 module 241 (FIG. 2) of memory 123 includes relevant marketing device data 190 representing at least one relevant marketing device that includes at least part of the matched marketing device data 102.

As also seen in FIG. 2, in one embodiment, process 300 module 241 (FIG. 2) of memory 123 includes relevant marketing device data transfer module that includes procedures, data, and/or instructions for transferring relevant marketing device data 190 to consumer computing system 150 of FIG. 1.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary marketing device management system 120 is provided below with respect to FIG. 3.

As used herein, the terms "consumer" and "user customer" are used interchangeably and include, but are not limited to, any party that desires to receive marketing devices identified and/or distributed using a process for providing refined location relevant marketing devices, and/or an authorized agent of any party that desires to receive marketing devices identified and/or distributed using a process for providing refined location relevant marketing devices, and/or any other authorized party associated with any party that desires to receive marketing devices identified and/or distributed using a process for providing refined location relevant marketing devices.

Herein, the terms "user", "merchant" and "user merchant" are used interchangeably to denote any party that wishes to have marketing devices distributed to consumers using a process for providing refined location relevant marketing devices, and/or an authorized agent of any party that wishes to have marketing devices distributed to consumers using a process for providing refined location relevant marketing devices, and/or any other authorized party associated with any party that wishes to have marketing devices distributed to consumers using a process for providing refined location relevant marketing devices.

As used herein, the term "marketing device" includes, but is not limited to: any promotional and/or discount offers; any price guarantee offers; any bundled offers; any coupons; any vouchers; or any other device distributed to consumers in an effort to attract and/or encourage business.

In accordance with one embodiment, a method and system for providing refined location relevant marketing devices includes a process for providing refined location relevant marketing devices whereby, in one embodiment, a marketing device management system obtains data representing one or more marketing devices from one or more merchants. In one embodiment, a merchant providing a marketing device is initially asked to provide location refinement data associated with the merchant, such as, but not limited to, the merchant's location, the merchant's hours of operation, the merchant's shipping policies, and/or the merchant's service policies and capabilities. In one embodiment, the location refinement data associated with the merchants is used to create, or supplement, merchant profiles for each of the merchants.

In one embodiment, the data representing the marketing devices is analyzed to determine location refinement data associated with the marketing devices such as, but not limited to, the products and/or services that are the subject of the marketing device, and/or the terms of the marketing device. In one embodiment, the data representing the marketing devices, and therefore the marketing devices, are categorized and stored in a marketing device database.

In one embodiment, when a consumer subscribes to the marketing device management system, the consumer is asked to provide location refinement data associated with the consumer, such as, but not limited to, the consumer's home address, the consumer's work address, and/or to provide access to data associated with the consumer from one or more data management systems associated with the consumer. In one embodiment, location refinement data associated with the consumer is used to create, or supplement, a consumer profile for the consumer.

In one embodiment, when a consumer makes a request to the marketing device management system for marketing devices associated with a given product or service, current location refinement data associated with the consumer is obtained such as, but not limited to, the consumer's present location.

In one embodiment, the marketing device management system includes a marketing device matching engine that includes a location refinement matching filter. When the consumer makes the request to the marketing device management system for marketing devices associated with a given product or service, the location refinement matching filter uses all, or part, of: the obtained location refinement data associated with the merchant, and/or the merchant's profile data; the obtained location refinement data associated with the marketing devices; the obtained location refinement data associated with the consumer, and/or the consumer's profile data; and the obtained current location refinement data associated with the consumer, to determine the marketing devices in the marketing device database most relevant to the consumer, and the consumer's current state.

In one embodiment, the data representing the most relevant marketing devices is then provided to the consumer.

Figure 3:
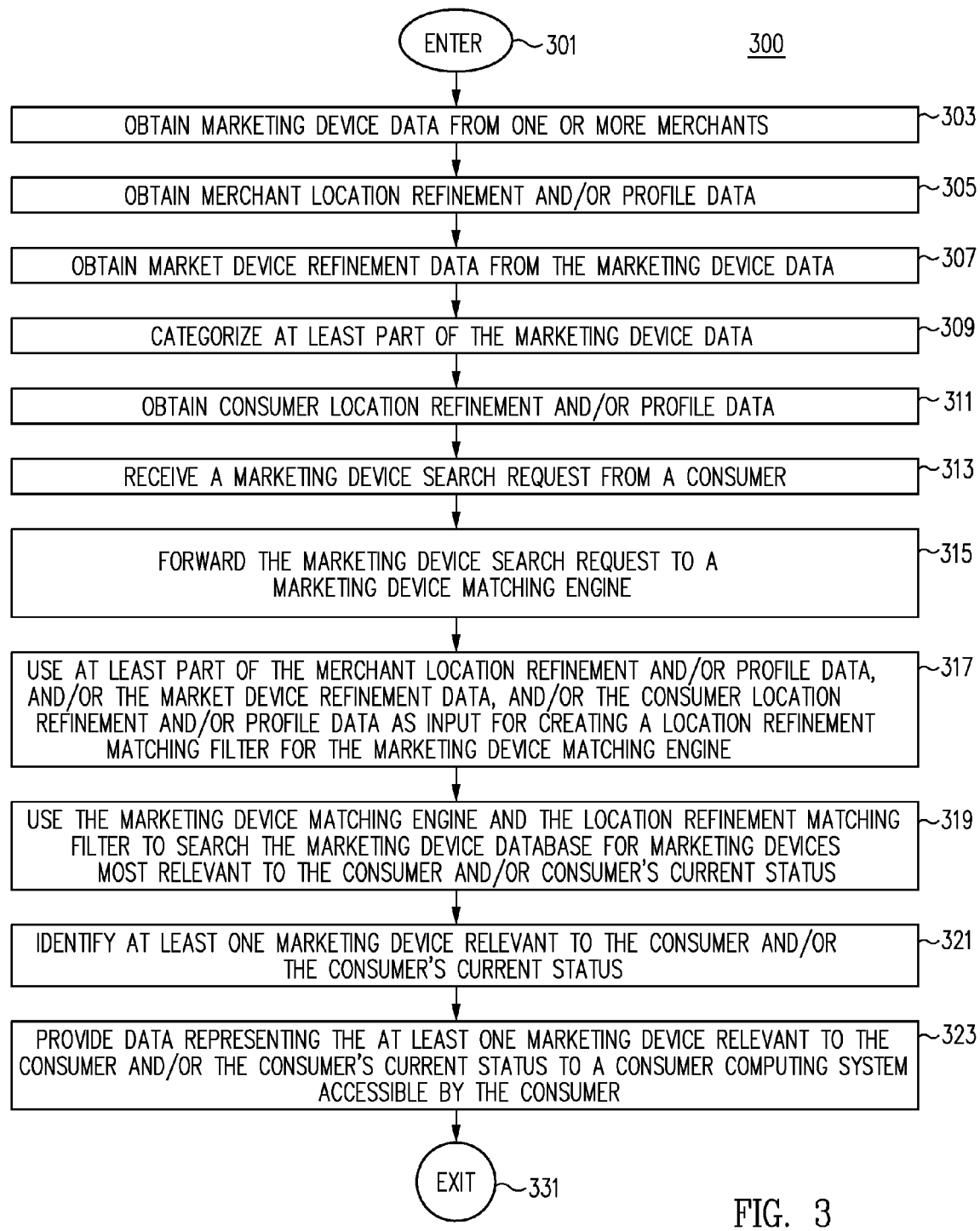
FIG. 3 is a flow chart depicting a process for providing refined location relevant marketing devices in accordance with one embodiment.

FIG. 3 a flow chart depicting a process for providing refined location relevant marketing devices 300 in accordance with one embodiment. Process for providing refined location relevant marketing devices 300 begins at ENTER OPERATION 301 of FIG. 3 and process flow proceeds to OBTAIN MARKETING DEVICE DATA FROM ONE OR MORE MERCHANTS OPERATION 303.

In one embodiment, at OBTAIN MARKETING DEVICE DATA FROM ONE OR MORE MERCHANTS OPERATION 303 a marketing device management system obtains data representing one or more marketing devices from one or more merchants.

In one embodiment, at OBTAIN MARKETING DEVICE DATA FROM ONE OR MORE MERCHANTS OPERATION 303 at least part of the data representing one or more marketing devices, such as marketing device data 102 of FIGS. 1 and 2, is obtained from the merchants offering the marketing devices, and/or from a merchant computing system, such as merchant computing system 100 of FIG. 1.

Returning to FIG. 2, in one embodiment, at least part of the data representing one or more marketing devices is obtained from merchants at OBTAIN MARKETING DEVICE DATA FROM ONE OR MORE MERCHANTS OPERATION 303 via one or more mobile computing systems, such as a mobile phone.

In one embodiment, at least part of the data representing one or more marketing devices is obtained from merchants at OBTAIN MARKETING DEVICE DATA FROM ONE OR MORE MERCHANTS OPERATION 303 via a Short Message Service (SMS) message sent via an SMS capable communications network and an SMS capable system.

In one embodiment, at least part of the data representing one or more marketing devices is obtained from merchants at OBTAIN MARKETING DEVICE DATA FROM ONE OR MORE MERCHANTS OPERATION 303 via a user interface display and designated text fields and/or in a designated text format.

In one embodiment, at least part of the data representing one or more marketing devices is obtained at OBTAIN MARKETING DEVICE DATA FROM ONE OR MORE MERCHANTS OPERATION 303 using any means, method, process, and/or procedure, and/or any combination of means, methods, processes, and/or procedures, of obtaining data, as discussed herein, and/or as known in the art at the time of filing, and/or as developed after the time of filing.

In one embodiment, the data representing one or more marketing devices of OBTAIN MARKETING DEVICE DATA FROM ONE OR MORE MERCHANTS OPERATION 303 includes, but is not limited to, any one or more of: the name of the merchant and/or the merchant's business; the location of the merchant and/or the merchant's business; the products sold by the merchant and/or the merchant's business; the services provided by the merchant and/or the merchant's business; the products and/or services that are the subject of the marketing devices; the terms of the marketing devices, such as discount, price, bundled products, etc.; any conditions of the marketing devices, i.e., expiration dates, restrictions on use, bundled products, etc.; and/or any other marketing device data the merchant desires to provide and/or is required by the provider of the process for providing refined location relevant marketing devices.

In one embodiment, the data representing the marketing devices, and therefore the marketing devices, is categorized and stored at OBTAIN MARKETING DEVICE DATA FROM ONE OR MORE MERCHANTS OPERATION 303.

In various embodiments, the marketing device data of OBTAIN MARKETING DEVICE DATA FROM ONE OR MORE MERCHANTS OPERATION 303 is stored in a memory system, or database, or in a cache memory, or in any main memory or mass memory, associated with any computing system as discussed herein, and/or as known in the art at the time of filing, and/or as developed after the time of filing.

In various embodiments, the marketing device data of OBTAIN MARKETING DEVICE DATA FROM ONE OR MORE MERCHANTS OPERATION 303 in whole, or in part, is stored in any computing system, such as marketing device management system 120 of FIG. 1, and/or a database, such as marketing device database 160 of FIG. 1, or any other device, in another location, or on/in a computer readable medium, and/or any other computer program product.

Returning to FIG. 3, in various embodiments, the marketing device data of OBTAIN MARKETING DEVICE DATA FROM ONE OR MORE MERCHANTS OPERATION 303, in whole, or in part, is stored on a webpage, in a web-based system, or on a public network such as the Internet.

In one embodiment, once a marketing device management system obtains data representing one or more marketing devices from one or more merchants at OBTAIN MARKETING DEVICE DATA FROM ONE OR MORE MERCHANTS OPERATION 303 process flow proceeds to OBTAIN MERCHANT LOCATION REFINEMENT AND/OR PROFILE DATA OPERATION 305.

In one embodiment, at OBTAIN MERCHANT LOCATION REFINEMENT AND/OR PROFILE DATA OPERATION 305 merchant location refinement data associated with the merchants providing marketing device data at OBTAIN MARKETING DEVICE DATA FROM ONE OR MORE MERCHANTS OPERATION 303 is obtained.

In one embodiment, at OBTAIN MERCHANT LOCATION REFINEMENT AND/OR PROFILE DATA OPERATION 305 merchant location refinement data, such as merchant location refinement data 172 of FIGS. 1 and 2, is obtained.

Returning to FIG. 3, in one embodiment, at OBTAIN MERCHANT LOCATION REFINEMENT AND/OR PROFILE DATA OPERATION 305 merchants providing marketing device data are initially asked to provide merchant location refinement data to be associated with the merchants, such as, but not limited to: the name of the merchant and/or the merchant's business; the location of the merchant and/or the merchant's business; the products sold by the merchant and/or the merchant's business; the services provided by the merchant and/or the merchant's business; all the merchant's location(s); the merchant's hours of operation; the merchants' contact information, such as e-mail, web page, social media accounts, phone number etc.; the merchant's shipping policies; proximity of the merchant's location to public transportation; and/or the merchant's service policies and capabilities. In one embodiment, this location refinement data associated with the merchant is used to create, or supplement, merchant profiles for each of the merchants.

In one embodiment, at OBTAIN MERCHANT LOCATION REFINEMENT AND/OR PROFILE DATA OPERATION 305 the merchant location refinement data, and/or the merchant profile data, is categorized and stored.

In various embodiments, the merchant location refinement data, and/or the merchant profile data, of OBTAIN MARKETING DEVICE DATA FROM ONE OR MORE MERCHANTS OPERATION 303 in whole, or in part, is stored in any computing system, such as marketing device management system 120 of FIG. 1, and/or a database, such as merchant database 170 of FIG. 1, or any other device, in another location, or on/in a computer readable medium, and/or any other computer program product.

Returning to FIG. 3, in various embodiments, the merchant location refinement data, and/or the merchant profile data, of OBTAIN MARKETING DEVICE DATA FROM ONE OR MORE MERCHANTS OPERATION 303, in whole, or in part, is stored on a webpage, in a web-based system, or on a public network such as the Internet.

In one embodiment, once merchant location refinement data associated with the merchants providing marketing device data at OBTAIN MARKETING DEVICE DATA FROM ONE OR MORE MERCHANTS OPERATION 303, is obtained at OBTAIN MERCHANT LOCATION REFINEMENT AND/OR PROFILE DATA OPERATION 305 process flow proceeds to OBTAIN MARKET DEVICE REFINEMENT DATA FROM THE MARKETING DEVICE DATA OPERATION 307.

In one embodiment, at OBTAIN MARKET DEVICE REFINEMENT DATA FROM THE MARKETING DEVICE DATA OPERATION 307 the data representing the marketing devices of OBTAIN MARKETING DEVICE DATA FROM ONE OR MORE MERCHANTS OPERATION 303, and/or the merchant location refinement data of OBTAIN MERCHANT LOCATION REFINEMENT AND/OR PROFILE DATA OPERATION 305, is analyzed to determine marketing device location refinement data associated with the marketing devices such as, but not limited to: the name of the merchant and/or the merchant's business; the location of the merchant and/or the merchant's business; the products sold by the merchant and/or the merchant's business; the services provided by the merchant and/or the merchant's business; all the merchant's location(s); the merchant's hours of operation; the merchants' contact information, such as e-mail, web page, social media accounts, phone number etc.; the merchant's shipping policies; proximity of the merchant's location to public transportation; the merchant's service policies and capabilities; the products and/or services that are the subject of the marketing devices; the terms of the marketing devices, such as discount, price, bundled products, etc.; any conditions of the marketing devices, i.e., expiration dates, restrictions on use, bundled products, etc.; and/or any other marketing device location refinement data associated with the marketing devices considered relevant.

In various embodiments, the marketing device location refinement data of OBTAIN MARKET DEVICE REFINEMENT DATA FROM THE MARKETING DEVICE DATA OPERATION 307 is stored in a memory system, or database, or in a cache memory, or in any main memory or mass memory, associated with any computing system as discussed herein, and/or as known in the art at the time of filing, and/or as developed after the time of filing.

In various embodiments, the marketing device location refinement data of OBTAIN MARKET DEVICE REFINEMENT DATA FROM THE MARKETING DEVICE DATA OPERATION 307 in whole, or in part, is stored in any computing system, such as marketing device management system 120 of FIG. 1, and/or a database, such as marketing device database 160 of FIG. 1, or any other device, in another location, or on/in a computer readable medium, and/or any other computer program product.

Returning to FIG. 3, in various embodiments, the marketing device location refinement data of OBTAIN MARKET DEVICE REFINEMENT DATA FROM THE MARKETING DEVICE DATA OPERATION 307, in whole, or in part, is stored on a webpage, in a web-based system, or on a public network such as the Internet.

In one embodiment, once the data representing the marketing devices of OBTAIN MARKETING DEVICE DATA FROM ONE OR MORE MERCHANTS OPERATION 303, and/or the merchant location refinement data of OBTAIN MERCHANT LOCATION REFINEMENT AND/OR PROFILE DATA OPERATION 305, is analyzed to determine marketing device location refinement data associated with the marketing devices at OBTAIN MARKET DEVICE REFINEMENT DATA FROM THE MARKETING DEVICE DATA OPERATION 307, process flow proceeds to CATEGORIZE AT LEAST PART OF THE MARKETING DEVICE DATA OPERATION 309.

In one embodiment, at CATEGORIZE AT LEAST PART OF THE MARKETING DEVICE DATA OPERATION 309, the data representing the marketing devices of OBTAIN MARKETING DEVICE DATA FROM ONE OR MORE MERCHANTS OPERATION 303, and/or the merchant location refinement data of OBTAIN MERCHANT LOCATION REFINEMENT AND/OR PROFILE DATA OPERATION 305, and/or the marketing device location refinement data associated with the marketing devices of OBTAIN MARKET DEVICE REFINEMENT DATA FROM THE MARKETING DEVICE DATA OPERATION 307, is analyzed to categorize and store the data representing the marketing devices of OBTAIN MARKETING DEVICE DATA FROM ONE OR MORE MERCHANTS OPERATION 303.

As a specific example, in one embodiment, at CATEGORIZE AT LEAST PART OF THE MARKETING DEVICE DATA OPERATION 309, data representing marketing devices is categorized based, at least in part, on the type of product and/or service that is the subject of the marketing devices. For instance, in one example, data representing marketing devices is categorized as being associated with "durable" goods, such as washing machines, or non-durable goods, such as disposable household goods.

In one embodiment, at CATEGORIZE AT LEAST PART OF THE MARKETING DEVICE DATA OPERATION 309, data representing marketing devices is categorized based any criteria desired.

In one embodiment, once the data representing the marketing devices, and/or the merchant location refinement data, and/or the marketing device location refinement data, is analyzed to categorize the data representing the marketing devices at CATEGORIZE AT LEAST PART OF THE MARKETING DEVICE DATA OPERATION 309, process flow proceeds to OBTAIN CONSUMER LOCATION REFINEMENT AND/OR PROFILE DATA OPERATION 311.

In one embodiment, at OBTAIN CONSUMER LOCATION REFINEMENT AND/OR PROFILE DATA OPERATION 311 consumer location refinement data to be associated with the consumers is obtained.

In one embodiment, at OBTAIN CONSUMER LOCATION REFINEMENT AND/OR PROFILE DATA OPERATION 311 a consumer desiring to utilize the marketing device management system, such as marketing device management system 120 of FIGS. 1 and 2, to search for, and obtain, marketing devices is requested to provide consumer profile data, at least part of which is to be used as consumer location refinement data, such as consumer location refinement data 182 of FIGS. 1 and 2.

Returning to FIG. 3, in various embodiments, the consumer location refinement data of OBTAIN CONSUMER LOCATION REFINEMENT AND/OR PROFILE DATA OPERATION 311 includes, but is not limited to: the consumer's home address; the consumer's work address; the consumer's shopping likes and dislikes; the consumer's shopping history, including transaction history; the consumer's age; the consumer's occupation; the consumer's sex; the consumer's marital status and/or number of dependents; when and where the consumer prefers to shop; and/or any other personal and/or demographic data associated with the consumer that is desired by the provider of the marketing device management system, and/or the process for providing refined location relevant marketing devices.

In one embodiment, the consumer location refinement data is obtained at OBTAIN CONSUMER LOCATION REFINEMENT AND/OR PROFILE DATA OPERATION 311 from any one or more of, but not limited to: the consumers themselves; computing systems associated with the consumers; mobile computing systems associated with the consumers; data collected by monitoring a consumers historical usage of marketing devices, including location relevant marketing devices; and/or any other source of consumer data, or combination of sources of consumer data, as discussed herein, and/or as known in the art at the time of filing, and/or as developed after the time of filing.

In one embodiment, the consumer location refinement data is provided to the marketing device management system, and/or the process for providing refined location relevant marketing devices, at OBTAIN CONSUMER LOCATION REFINEMENT AND/OR PROFILE DATA OPERATION 311 by the consumer providing process for providing refined location relevant marketing devices 300 access to data from one or more data management systems associated with the consumer.

Types of data management systems currently available include, but are not limited to, any of the following: an on-line, or web-based, or computing system implemented, personal financial management system, package, program, module, or application; an on-line, or web-based, or computing system implemented, calendar and/or appointment system, package, program, module, or application; an on-line, or web-based, or computing system implemented personal or business contacts management system, package, program, module, or application; on-line, or web-based, or computing system implemented, personal or business tax preparation and/or management system, package, program, module, or application, or any of the numerous data management systems as discussed herein, and/or as known in the art at the time of filing, and/or as developed after the time of filing.

Specific examples of data management systems currently available include, but are not limited to: Quicken™, available from Intuit Inc. of Mountain View, Calif.; Quicken Online™, available from Intuit Inc. of Mountain View, Calif.; Outlook, available from Microsoft, Inc. of Redmond, Wash.; QuickBooks™, available from Intuit Inc. of Mountain View, Calif.; QuickBooks Online™, available from Intuit Inc. of Mountain View, Calif.; Mint.com™, available from Intuit Inc. of Mountain View, Calif.; QuickReceipts™, available from Intuit Inc. of Mountain View, Calif.; TurboTax™ available from Intuit Inc. of Mountain View, Calif.; Microsoft Money™, previously available from Microsoft, Inc. of Redmond, Wash.; or various other data management systems as discussed herein, and/or as known to those of skill in the art at the time of filing, and/or as developed after the time of filing.

In one embodiment, by obtaining the consumer location refinement data from one or more data management systems associated with the consumer, detailed consumer personal, demographic, and financial data, including financial transaction data, can be obtained, and used by, process for providing refined location relevant marketing devices 300.

In one embodiment, the consumer location refinement data associated with the consumers of OBTAIN CONSUMER LOCATION REFINEMENT AND/OR PROFILE DATA OPERATION 311 is used to create, or supplement, a consumer profile for each consumer.

In addition, as discussed below, in one embodiment, when a consumer makes a request to the marketing device management system for marketing devices associated with a given product or service, current location refinement data associated with the consumer is obtained such as, but not limited to, the consumer's present location, and this current location refinement data associated with the consumer is added to the consumer location refinement data.

In one embodiment, at OBTAIN CONSUMER LOCATION REFINEMENT AND/OR PROFILE DATA OPERATION 311 the consumer location refinement data, and/or the consumer profile data, and/or current location refinement data associated with the consumer, is categorized and stored.

In various embodiments, the consumer location refinement data, and/or the consumer profile data, and/or current location refinement data associated with the consumer, of OBTAIN CONSUMER LOCATION REFINEMENT AND/OR PROFILE DATA OPERATION 311 is stored in a memory system, or database, or in a cache memory, or in any main memory or mass memory, associated with any computing system as discussed herein, and/or as known in the art at the time of filing, and/or as developed after the time of filing.

In various embodiments, the consumer location refinement data, and/or the consumer profile data, and/or current location refinement data associated with the consumer, of OBTAIN CONSUMER LOCATION REFINEMENT AND/OR PROFILE DATA OPERATION 311 in whole, or in part, is stored in any computing system, such as marketing device management system 120 of FIG. 1, and/or a database, such as consumer database 180 of FIG. 1, or any other device, in another location, or on/in a computer readable medium, and/or any other computer program product.

Returning to FIG. 3, in various embodiments, the consumer location refinement data, and/or the consumer profile data, and/or current location refinement data associated with the consumer, of OBTAIN CONSUMER LOCATION REFINEMENT AND/OR PROFILE DATA OPERATION 311, in whole, or in part, is stored on a webpage, in a web-based system, or on a public network such as the Internet.

In one embodiment, once consumer location refinement data is obtained at OBTAIN CONSUMER LOCATION REFINEMENT AND/OR PROFILE DATA OPERATION 311, process flow proceeds to RECEIVE A MARKETING DEVICE SEARCH REQUEST FROM A CONSUMER OPERATION 313.

In one embodiment, at RECEIVE A MARKETING DEVICE SEARCH REQUEST FROM A CONSUMER OPERATION 313 a marketing device request is made by a consumer to the marketing device management system for one or more marketing devices.

In one embodiment, at RECEIVE A MARKETING DEVICE SEARCH REQUEST FROM A CONSUMER OPERATION 313 the marketing device request made by the consumer generates marketing device request data, such as marketing device request data 158 of FIGS. 1 and 2, and the marketing device request data is sent to a marketing device management system, such as marketing device management system 120 of FIGS. 1 and 2.

Returning to FIG. 3, in one embodiment, the marketing device request data includes data representing any of, but not limited to: the type of product and/or service the consumer desires; any name brands or model numbers the consumer desires; and/or any other data associated with the product and/or service, and/or marketing devices, the consumer desires.

In one embodiment, the consumer makes the request to the marketing device management system for marketing devices associated with the desired product or service at RECEIVE A MARKETING DEVICE SEARCH REQUEST FROM A CONSUMER OPERATION 313 using a consumer computing system associated with, and/or accessible by, the consumer, such as consumer computing system 150 of FIG. 1.

Herein, the term "computing system" includes, any computing system discussed herein, and/or as known in the art at the time of filing, and/or as developed after the time of filing, such as, but not limited to: any mobile computing system, such as a mobile phone, a smart phone, an internet appliance, any SMS capable system, or any other mobile computing system as discussed herein, and/or as known in the art at the time of filing, and/or as developed after the time of filing; any desktop computing system; any laptop computing system; any notebook computing system; any workstation; a two-way pager; a Personal Digital Assistant (PDA); a server computer, any other device, or any desired combination of these devices, that includes components that can execute all, or part, of process for a providing refined location relevant marketing devices in accordance with at least one of the embodiments as described herein.

Returning to FIG. 3, as noted above, in one embodiment, when the marketing device request is made by the consumer at RECEIVE A MARKETING DEVICE SEARCH REQUEST FROM A CONSUMER OPERATION 313 current location refinement data associated with the consumer is obtained such as, but not limited to, the consumer's present location, or a location desirable and/or otherwise to/designated by, the consumer.

In one embodiment, at RECEIVE A MARKETING DEVICE SEARCH REQUEST FROM A CONSUMER OPERATION 313 the consumer's current location refinement data is obtained from the consumer via manual input from the consumer thru one or more consumer computing systems.

In one embodiment, at RECEIVE A MARKETING DEVICE SEARCH REQUEST FROM A CONSUMER OPERATION 313 the consumer's current location refinement data is obtained automatically, or semi-automatically, upon consumer approval, from the one or more consumer computing systems, and a Global Positioning Satellite (GPS) capability, or any similar location tracking capability, associated with the one or more consumer computing systems.

In one embodiment, the consumer's current location refinement data is obtained at RECEIVE A MARKETING DEVICE SEARCH REQUEST FROM A CONSUMER OPERATION 313 using any method, mechanism, process, procedure, or device for obtaining data indicating a consumer's current location, projected location, or a desired location, as discussed herein, and/or as known in the art at the time of filing, and/or as developed after the time of filing.

In various embodiments, the marketing device request data, and/or the consumer's current location refinement data, of RECEIVE A MARKETING DEVICE SEARCH REQUEST FROM A CONSUMER OPERATION 313 is stored in a memory system, or database, or in a cache memory, or in any main memory or mass memory, associated with any computing system as discussed herein, and/or as known in the art at the time of filing, and/or as developed after the time of filing.

In various embodiments, the marketing device request data, and/or the consumer's current location refinement data, of RECEIVE A MARKETING DEVICE SEARCH REQUEST FROM A CONSUMER OPERATION 313 in whole, or in part, is stored in any computing system, such as marketing device management system 120 of FIG. 1, and/or a database, such as marketing device database 160 and/or consumer database 180 of FIG. 1, or any other device, in another location, or on/in a computer readable medium, and/or any other computer program product.

Returning to FIG. 3, in various embodiments, the marketing device request data, and/or the consumer's current location refinement data, of RECEIVE A MARKETING DEVICE SEARCH REQUEST FROM A CONSUMER OPERATION 313, in whole, or in part, is stored on a webpage, in a web-based system, or on a public network such as the Internet.

In one embodiment, once a marketing device request is made by a consumer to the marketing device management system for one or more marketing devices at RECEIVE A MARKETING DEVICE SEARCH REQUEST FROM A CONSUMER OPERATION 313, process flow proceeds to FORWARD THE MARKETING DEVICE SEARCH REQUEST TO A MARKETING DEVICE MATCHING ENGINE OPERATION 315.

In one embodiment, at FORWARD THE MARKETING DEVICE SEARCH REQUEST TO A MARKETING DEVICE MATCHING ENGINE OPERATION 315 the marketing device request data of RECEIVE A MARKETING DEVICE SEARCH REQUEST FROM A CONSUMER OPERATION 313 is forwarded to a marketing device matching engine.

In one embodiment, the marketing device management system, such marketing device management system 120 of FIGS. 1 and 2, includes a marketing device matching engine, such as marketing device matching engine 124 of FIGS. 1 and 2.

Returning to FIG. 3, in one embodiment, at FORWARD THE MARKETING DEVICE SEARCH REQUEST TO A MARKETING DEVICE MATCHING ENGINE OPERATION 315 the marketing device request data of RECEIVE A MARKETING DEVICE SEARCH REQUEST FROM A CONSUMER OPERATION 313 is forwarded to a marketing device matching engine that is implemented by one or more processors, such as CPU(s) 121, of FIG. 1, associated with one or more computing systems, such as marketing device management system 120, of FIG. 1.

Returning to FIG. 3, in one embodiment, once the marketing device request data of RECEIVE A MARKETING DEVICE SEARCH REQUEST FROM A CONSUMER OPERATION 313 is forwarded to a marketing device matching engine at FORWARD THE MARKETING DEVICE SEARCH REQUEST TO A MARKETING DEVICE MATCHING ENGINE OPERATION 315, process flow proceeds to USE AT LEAST PART OF THE MERCHANT LOCATION REFINEMENT AND/OR PROFILE DATA, AND/OR THE MARKET DEVICE REFINEMENT DATA, AND/OR THE CONSUMER LOCATION REFINEMENT AND/OR PROFILE DATA AS INPUT FOR CREATING A LOCATION REFINEMENT MATCHING FILTER FOR THE MARKETING DEVICE MATCHING ENGINE OPERATION 317.

In one embodiment, at USE AT LEAST PART OF THE MERCHANT LOCATION REFINEMENT AND/OR PROFILE DATA, AND/OR THE MARKET DEVICE REFINEMENT DATA, AND/OR THE CONSUMER LOCATION REFINEMENT AND/OR PROFILE DATA AS INPUT FOR CREATING A LOCATION REFINEMENT MATCHING FILTER FOR THE MARKETING DEVICE MATCHING ENGINE OPERATION 317 at least part of: the marketing device request data; the merchant location refinement data; the marketing device location refinement data; the consumer location refinement data; and the consumer current location refinement data is used to create, and/or as input to, a location refinement matching filter that is included in the marketing device matching engine.

In one embodiment, at USE AT LEAST PART OF THE MERCHANT LOCATION REFINEMENT AND/OR PROFILE DATA, AND/OR THE MARKET DEVICE REFINEMENT DATA, AND/OR THE CONSUMER LOCATION REFINEMENT AND/OR PROFILE DATA AS INPUT FOR CREATING A LOCATION REFINEMENT MATCHING FILTER FOR THE MARKETING DEVICE MATCHING ENGINE OPERATION 317 at least part of: the marketing device request data; the merchant location refinement data; the marketing device location refinement data; the consumer location refinement data; and the consumer current location refinement data is used to create, and/or as input to, a location refinement matching filter, such as location refinement matching filter 126 of FIGS. 1 and 2, that is included in the marketing device matching engine, such as marketing device matching engine 124 of FIGS. 1 and 2.

In one embodiment, once at least part of: the marketing device request data; the merchant location refinement data; the marketing device location refinement data; the consumer location refinement data; and the consumer current location refinement data is used to create, and/or as input to, a location refinement matching filter that is included in the marketing device matching engine at USE AT LEAST PART OF THE MERCHANT LOCATION REFINEMENT AND/OR PROFILE DATA, AND/OR THE MARKET DEVICE REFINEMENT DATA, AND/OR THE CONSUMER LOCATION REFINEMENT AND/OR PROFILE DATA AS INPUT FOR CREATING A LOCATION REFINEMENT MATCHING FILTER FOR THE MARKETING DEVICE MATCHING ENGINE OPERATION 317, process flow proceeds to USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319.

In one embodiment, at USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319 all, or part, of: the marketing device request data; the merchant location refinement data; the marketing device location refinement data; the consumer location refinement data; and the consumer current location refinement data is used by the marketing device matching engine and/or the location refinement matching filter to determine/match the marketing devices in the marketing device database most relevant to the consumer, and the consumer's current state.

In one embodiment, at USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319 all, or part, of: the marketing device request data, such as marketing device request data 158 of FIGS. 1 and 2; the merchant location refinement data, such as merchant location refinement data 172 of FIGS. 1 and 2; the marketing device data, such as marketing device data 102 of FIGS. 1 and 2; the consumer location refinement data, such as consumer location refinement data 182 of FIGS. 1 and 2; and the consumer current location refinement data is used by a marketing device matching engine, such as marketing device matching engine 124 of FIGS. 1 and 2, and/or a location refinement matching filter, such as location refinement matching filter 126 of FIGS. 1 and 2, to determine/match the marketing device data, such as marketing device data 102 of FIGS. 1 and 2, most relevant to the consumer, and the consumer's current state, under the direction of one or more processors, such as processor 121, of FIG. 1, associated with one or more computing systems, such as marketing device management system 120, of FIG. 1.

In one embodiment, at USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319 all, or part, of: the marketing device request data; the merchant location refinement data; the marketing device location refinement data; the consumer location refinement data; and the consumer current location refinement data is used by the marketing device matching engine and/or the location refinement matching filter to calculate a location relevancy score to be associated with the marketing devices. In one embodiment, the location relevancy score is then used by the marketing device matching engine and/or the location refinement matching filter, at least in part, to determine/match the marketing devices in the marketing device database most relevant to the consumer, and the consumer's current state.

In one embodiment, at USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319 the marketing device matching engine uses one or more processes to match one or more marketing devices in the marketing device database to the consumer's marketing device request and the consumer's current state. In some embodiments, these processes define, and/or use, weighting factors, and/or other methods, to emphasize one or more location refinement parameters associated with the consumer's marketing device request and the consumer's current state.

As a specific illustrative example, in one embodiment, the marketing device matching engine employs a matching process wherein location refinement factors are defined and assigned numerical values.

In this specific example, the location refinement factors are L1, L2, and L3. In this specific example, L1 is defined to be the physical distance between the consumer's position, as obtained from the consumer's current location refinement data, and the position of merchants associated with the marketing devices, as obtained from the marketing devices' location refinement data, and/or the merchants' location refinement data.

In this specific example, the value for L1 is assigned a numerical value as follows: L1=3, if the consumer and the merchant are within the same 1 to 2 square mile area; L1=2, if they are in the same suburb or zip code; and L1=1 if within the same city or area code.

In this specific example, L2 is defined to be any location-enhancing marketing device terms associated with marketing device, as obtained from the marketing devices' location refinement data, and/or the merchants' location refinement data, such as, but not limited to: free home delivery; free demo at home; free installation; and any location-enhancing terms that may enhance/refine the location relevancy of the offer.

In this specific example, the value for L2 is assigned a numerical value as follows: L2=3, if there are two or more location enhancers for both decision making and purchase; L2=2, if there is one location enhancer in the offer; L2=1, if none exist.

In this specific example, L3 is defined to be any commute refinement factors that refine a purely distance based analysis such as, but not limited to: the presence of good public transport connections to the merchant; shopping area where the merchant is located; expected traffic between the consumer's position and merchants' position; whether the consumer is currently at home or work, or out and about; the time of day the consumer is making the marketing device request; the day of the week the consumer is making the marketing device request; whether the merchants' locations are at, or near, locations the consumer has historically frequented and/or shopped; etc.

In this specific example, the value for L3 is assigned a numerical value as follows: L3=2, if two or more commute refinement factors are present/positive; L3=1, if one commute refinement factor is present/positive; L3=0, if no commute refinement factor is present/positive; L3=−1, if one commute refinement factor is negative; and L3=−2, if two or more commute refinement factors are negative.

In this specific illustrative example, the category of the product and/or service associated with the consumer's current marketing device search request is not only used to filter the marketing device search, but a category is assigned to the product and/or service and the category is used to define/determine category weighting factors to be assigned to the location refinement factors L1, L2, and L3.

For instance, in one specific example, the category weighting factors include three different values that are assigned to the location refinement factors L1, L2, and L3 as follows: a category weighting factor C1 assigned to location refinement factor L1; a category weighting factor C2 assigned to location refinement factor L2; and a category weighting factor C3 assigned to location refinement factor L3.

Consequently, in this specific illustrative example, a location relevancy score (LRS) for a marketing device is calculated as the sum:

$$L1(C1)+L2(C2)+L3(C3)=LRS.$$

In various applications, the category weighting factors are based on the type of product and/or service associated with the consumer's marketing device request and whether the type of product and/or service is a "durable" product, or a "non-durable.

As discussed above, recent research has found that if a consumer is looking for a durable item, such as a washing machine or a refrigerator, then marketing devices from merchants in closest neighboring areas are not particularly more relevant to that consumer than marketing devices from merchants in outlying areas and, therefore, other factors may be more useful in determining the most relevant marketing devices. However, on the contrary, if a consumer is looking for a non-durable, semi-durable, or a consumable item, such as groceries, clothing, or disposable household items, research has found that marketing devices from merchants in areas closest to the consumer really do tend to be much more important and relevant to that consumer.

In light of this research, in one example, if the type of product and/or service is categorized as a "durable" product, i.e., has the associated category of durable good then: the category weighting factor C1 assigned to location refinement factor L1 (physical distance) might be given a relatively low value, or fractional value, such as 0.5, thereby reflecting the relative unimportance of physical distance when durable goods are involved; the category weighting factor C2 assigned to location refinement factor L2 (location-enhancing marketing device terms) might be given a relatively high value, such as 1.5, thereby reflecting the relative importance of service, delivery charges, and installation, when durable goods are involved; and a category weighting factor C3 assigned to location refinement factor L3 (commute refinement factors) might be given a relatively neutral value such as 1.0, thereby reflecting the relative importance of commute refinement factors, such as available public transportation when durable goods are involved.

Consequently, in this specific illustrative example, a location relevancy score (LRS) for a marketing device associated with a durable good is calculated as the sum:

$$L1(0.5)+L2(1.5)+L3(1.0)=LRS.$$

On the other hand, in one example, if the type of product and/or service is a "non-durable" product, i.e., has the associated category of non-durable good then: the category weighting factor C1 assigned to location refinement factor L1 (physical distance) might be given a relatively high value, such as 1.5, thereby reflecting the relative importance of physical distance when non-durable goods are involved; the category weighting factor C2 assigned to location refinement factor L2 (location-enhancing marketing device terms) might be given a relatively low value, such as 0, thereby reflecting the relative unimportance, or irrelevance, of service, delivery charges, and installation, when non-durable goods are involved; and a category weighting factor C3 assigned to location refinement factor L3 (commute refinement factors) might be given a relatively neutral value such as 1.0, thereby reflecting the relative importance of commute refinement factors, such as available public transportation, when non-durable goods are involved.

Consequently, in this specific illustrative example, a location relevancy score (LRS) for a marketing device associated with a non-durable good is calculated as the sum:

$$L1(1.5)+L2(0)+L3(1.0)=LRS.$$

In one embodiment, the weighted summation, or location relevancy score (LRS), associated with the marketing devices is used to reflect a refined consideration of "functional" distance between the merchant offering the marketing device and the consumer that takes into consideration not only physical distance between the merchant offering the marketing device and the consumer (L1) but also the type of product and/or service being sought (C1, C2, and C2), the current state of the consumer (L2, L3), and various other relevancy and logistical factors (L2), that are largely ignored by currently available methods and systems. In one embodiment, as discussed below at IDENTIFY AT LEAST ONE MARKETING DEVICE RELEVANT TO THE CONSUMER AND/OR THE CONSUMER'S CURRENT STATUS OPERATION 321, this calculation is then used by the location refinement matching filter and the marketing device matching engine to match the most relevant one or more marketing devices in the marketing device database to the consumer's marketing device request and the consumer's current state.

In one embodiment, once all, or part, of: the marketing device request data; the merchant location refinement data; the marketing device location refinement data; the consumer location refinement data; and the consumer current location refinement data, is used by the marketing device matching engine and/or the location refinement matching filter to determine/match the marketing devices in the marketing device database most relevant to the consumer, and the consumer's current state, at USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319, process flow proceeds to IDENTIFY AT LEAST ONE MARKETING DEVICE RELEVANT TO THE CONSUMER AND/OR THE CONSUMER'S CURRENT STATUS OPERATION 321.

In one embodiment, at IDENTIFY AT LEAST ONE MARKETING DEVICE RELEVANT TO THE CONSUMER AND/OR THE CONSUMER'S CURRENT STATUS OPERATION 321, based on the analysis of USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319, one or more marketing devices represented by at least part of the marketing device data in the marketing device database are identified as being relevant to the consumer and the consumers marketing device request.

In one embodiment, at IDENTIFY AT LEAST ONE MARKETING DEVICE RELEVANT TO THE CONSUMER AND/OR THE CONSUMER'S CURRENT STATUS OPERATION 321, based on the analysis of USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319, one or more marketing devices represented by at least part of the marketing device data, such as relevant marketing device data 190 of FIGS. 1 and 2, in the marketing device database, such as marketing device database 160 of FIG. 1, are identified as being relevant to the consumer and the consumers marketing device request, as represented by marketing device request data 158 of FIGS. 1 and 2.

Returning to FIG. 3, once based on the analysis of USE THE MARKETING DEVICE MATCHING ENGINE AND THE LOCATION REFINEMENT MATCHING FILTER TO SEARCH THE MARKETING DEVICE DATABASE FOR MARKETING DEVICES MOST RELEVANT TO THE CONSUMER AND/OR THE CONSUMER'S CURRENT STATUS OPERATION 319, one or more marketing devices represented by at least part of the marketing device data in the marketing device database are identified as being relevant to the consumer and the consumers marketing device request at IDENTIFY AT LEAST ONE MARKETING DEVICE RELEVANT TO THE CONSUMER AND/OR THE CONSUMER'S CURRENT STATUS OPERATION 321, process flow proceeds to PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323.

In one embodiment, at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323 data representing the identified relevant marketing devices of IDENTIFY AT LEAST ONE MARKETING DEVICE RELEVANT TO THE CONSUMER AND/OR THE CONSUMER'S CURRENT STATUS OPERATION 321 is distributed to the consumer.

In one embodiment, at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323 data representing the identified relevant marketing devices of IDENTIFY AT LEAST ONE MARKETING DEVICE RELEVANT TO THE CONSUMER AND/OR THE CONSUMER'S CURRENT STATUS OPERATION 321 are distributed to the consumer as relevant marketing device data, such as relevant marketing device data 190, via one or more computing systems associated with the one or more consumers, such as consumer computing system 150 of FIG. 1.

Returning to FIG. 3, in one embodiment, at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323 data representing the identified relevant marketing devices of IDENTIFY AT LEAST ONE MARKETING DEVICE RELEVANT TO THE CONSUMER AND/OR THE CONSUMER'S CURRENT STATUS OPERATION 321 is distributed to the consumer via one or more mobile computing systems, such as mobile phones, associated with the one or more consumers.

In one embodiment, at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323 data representing the identified relevant marketing devices of IDENTIFY AT LEAST ONE MARKETING DEVICE RELEVANT TO THE CONSUMER AND/OR THE CONSUMER'S CURRENT STATUS OPERATION 321 is distributed to the consumer via one or more Short Message Service (SMS) messages sent via one or more SMS capable communications networks and one or more SMS capable systems associated with the one or more consumers.

In one embodiment, at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323 data representing the identified relevant marketing devices of IDENTIFY AT LEAST ONE MARKETING DEVICE RELEVANT TO THE CONSUMER AND/OR THE CONSUMER'S CURRENT STATUS OPERATION 321 is distributed to the consumer via any method, means, mechanism, process, procedure, or device for distributing data as discussed herein, and/or as known in the art at the time of filing, and/or as developed after the time of filing.

In one embodiment, once data representing the identified relevant marketing devices of IDENTIFY AT LEAST ONE MARKETING DEVICE RELEVANT TO THE CONSUMER AND/OR THE CONSUMER'S CURRENT STATUS OPERATION 321 is distributed to the consume at PROVIDE DATA REPRESENTING THE AT LEAST ONE MARKETING DEVICE RELEVANT TO THE CONSUMER AND/OR THE CONSUMER'S CURRENT STATUS TO A CONSUMER COMPUTING SYSTEM ACCESSIBLE BY THE CONSUMER OPERATION 323, process flow proceeds to EXIT OPERATION 331.

In one embodiment at EXIT OPERATION 331 process for providing refined location relevant marketing devices 300 is exited to await new data.

Using process for providing refined location relevant marketing devices 300, a refined, and more accurate, system and method for determining location relevancy of marketing devices to a given consumer is provided that takes into account many important location relevancy/refinement factors that the current simplistic and binary methods for determining location relevancy often ignore. As a result, using process for providing refined location relevant marketing devices 300, marketing devices are distributed to consumers that are far more likely to be of relevance to the consumers, and therefore are far more likely to be used by the consumers. Therefore, both merchants and consumers are benefitting by the use of process for providing refined location relevant marketing devices 300.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing refined location relevant marketing devices comprising:
   using one or more processors associated with one or more computing systems to obtain marketing device data from one or more merchants;
   using one or more processors associated with one or more computing systems to categorize and store the marketing device data in a marketing device database;
   using one or more processors associated with one or more computing systems to obtain merchant location refinement data from the one or more merchants providing marketing device data;
   using one or more processors associated with one or more computing systems to obtain consumer location refinement data from one or more consumers;
   receiving marketing device request data representing one or more marketing device search requests from a consumer;
   using one or more processors associated with one or more computing systems and the marketing device request data to search the marketing device database for marketing devices that initially match the marketing device request data;
   using one or more processors associated with one or more computing systems to use at least part of the marketing device data, the merchant location refinement data, and the consumer location refinement data, to calculate a location relevancy score for each of marketing devices that initially matched the marketing device request data, the location relevancy score being a combination of a plurality of location relevant factors, each modified by respective individual weighting factors, wherein determining the value of at least one location relevant factor includes consideration of expected traffic between the consumer's present position and the merchants' position, further wherein either a first set of weighting factors or a second set of weighting factors is selected based on the type of goods associated with the marketing device, wherein the system is configured so that a category weighting factor associated with physical distance between a consumer and a merchant will be lower than when the type of goods is durable than when the type of goods is nondurable, and a category weighting factor associated with service, delivery charges or installation is greater if the type of goods is durable, than when the type of goods is nondurable; and
   selecting one or more of the marketing devices that initially matched the marketing device request data to provide to the consumer based, at least in part, on the location relevancy score for each of marketing devices that initially matched the marketing device request data.

2. The computing system implemented process for providing refined location relevant marketing devices of claim 1, wherein;
   at least part of the marketing device data is selected from the group of marketing device data consisting of at least one of:
   the name of the merchant offering the marketing device;
   the products sold by the merchant offering the marketing device;
   the services provided by the merchant offering the marketing device;
   the products and/or services that are the subject of the marketing device data;
   the terms of the marketing device; and
   any conditions of the marketing device.

3. The computing system implemented process for providing refined location relevant marketing devices of claim 1, wherein;
   at least part of the merchant location refinement data is selected from the group of merchant location refinement data consisting of at least one of:
   the name of the merchant and/or the merchant's business;
   the location of the merchant and/or the merchant's business;
   the products sold by the merchant and/or the merchant's business;
   the services provided by the merchant and/or the merchant's business;
   all the merchant's location(s);
   the merchant's hours of operation;

the merchants' contact information, such as e-mail, web page, social media accounts, phone number;
the merchant's shipping policies;
proximity of the merchant's location to public transportation; and
the merchant's service policies and capabilities.

4. The computing system implemented process for providing refined location relevant marketing devices of claim 1, wherein;
at least part of the consumer location refinement data is selected from the group of consumer location refinement data consisting of at least one of:
the consumer's home address;
the consumer's work address;
the consumer's shopping likes and dislikes;
the consumer's shopping history;
the consumer's age;
the consumer's occupation;
the consumer's sex;
the consumer's marital status and/or number of dependents; and
when and where the consumer prefers to shop.

5. The computing system implemented process for providing refined location relevant marketing devices of claim 1, wherein;
at least part of the consumer location refinement data is obtained from one or more data management systems associated with one or more consumers.

6. The computing system implemented process for providing refined location relevant marketing devices of claim 1, wherein;
a location relevancy score for a marketing device is calculated based, at least in part, on the category of the product and/or service associated with the marketing device data.

7. The computing system implemented process for providing refined location relevant marketing devices of claim 6, wherein;
the category of the product and/or service associated with the marketing device data is determined to be either durable good or non-durable good.

8. The computing system implemented process for providing refined location relevant marketing devices of claim 1, wherein;
a location relevancy score for a marketing device is calculated based, at least in part, on one or more location-enhancing marketing device terms associated with the marketing device data.

9. The computing system implemented process for providing refined location relevant marketing devices of claim 8, wherein;
at least one of the location-enhancing marketing device terms is selected from the group of location-enhancing marketing device terms consisting of at least one of:
free home delivery;
free demo at home; and
free installation.

10. The computing system implemented process for providing refined location relevant marketing devices of claim 1, wherein;
a location relevancy score for a marketing device is calculated based, at least in part, on one or more commute refinement factors associated with the marketing device data.

11. The computing system implemented process for providing refined location relevant marketing devices of claim 10, wherein;
at least one of the commute refinement factors is selected from the group of commute refinement factors consisting of at least one of:
the presence of good public transport connections to the merchant;
shopping area where the merchant is located;
whether or not the consumer is currently at home or work;
the time of day the consumer is making the marketing device request;
the day of the week the consumer is making the marketing device request; and
whether the merchants' locations are at, or near, locations the consumer has historically frequented and/or shopped.

12. A system for providing refined location relevant marketing devices comprising:
one or more merchant computing systems accessible by one or more merchants;
a marketing device database including marketing device data, at least part of the marketing device data being obtained from one of more of the one or more merchant computing systems;
a merchant database including merchant location refinement data;
a consumer computing system accessible by a consumer;
a consumer database including consumer location refinement data;
a marketing device management system communicatively coupled to the marketing device database, the merchant database, the consumer database, and the consumer computing system, the marketing device management system including a marketing device matching engine and one or more associated processors, the one or more processors associated with the marketing device management system for implementing at least part of a process for providing refined location relevant marketing devices, the process for providing refined location relevant marketing devices comprising:
receiving marketing device request data representing one or more marketing device search requests from the consumer computing system;
using the marketing device request data to search the marketing device database for marketing devices that initially match the marketing device request data;
using the marketing device matching engine and at least part of the marketing device data, the merchant location refinement data, and the consumer location refinement data, to calculate a location relevancy score for each of marketing devices that initially matched the marketing device request data, the location relevancy score being a combination of a plurality of location relevant factors, each modified by respective individual weighting factors, wherein determining the value of at least one location relevant factor includes consideration of expected traffic between the consumer's present position and the merchants' position, further wherein either a first set of weighting factors or a second set of weighting factors is selected based on the type of goods associated with the marketing device, wherein the system is configured so that a category weighting factor associated with physical distance between a consumer and a merchant will be lower than when the type of goods is durable than when the type of goods is nondurable, and a category weighting factor associated with service, delivery charges or installation is greater if the type of goods is durable, than when the type of goods is nondurable; and selecting one or more of the marketing devices that initially matched the marketing device request data to provide to the consumer computing system based, at least in part, on the location relevancy score for each of marketing devices that initially matched the marketing device request data.

13. The system for providing refined location relevant marketing devices of claim 12, wherein;
at least part of the marketing device data is selected from the group of marketing device data consisting of at least one of:
the name of the merchant offering the marketing device;
the products sold by the merchant offering the marketing device;
the services provided by the merchant offering the marketing device;
the products and/or services that are the subject of the marketing device data;
the terms of the marketing device; and
any conditions of the marketing device.

14. The system for providing refined location relevant marketing devices of claim 12, wherein;
at least part of the merchant location refinement data is selected from the group of merchant location refinement data consisting of at least one of:
the name of the merchant and/or the merchant's business;
the location of the merchant and/or the merchant's business;
the products sold by the merchant and/or the merchant's business;
the services provided by the merchant and/or the merchant's business;
all the merchant's location(s);
the merchant's hours of operation;
the merchants' contact information, such as e-mail, web page, social media accounts, phone number;
the merchant's shipping policies;
proximity of the merchant's location to public transportation; and
the merchant's service policies and capabilities.

15. The system for providing refined location relevant marketing devices of claim 12, wherein;
at least part of the consumer location refinement data is selected from the group of consumer location refinement data consisting of at least one of:
the consumer's home address;
the consumer's work address;
the consumer's shopping likes and dislikes;
the consumer's shopping history;
the consumer's age;
the consumer's occupation;
the consumer's sex;
the consumer's marital status and/or number of dependents; and
when and where the consumer prefers to shop.

16. The system for providing refined location relevant marketing devices of claim 12, wherein;
at least part of the consumer location refinement data is obtained from one or more data management systems associated with one or more consumers.

17. The system for providing refined location relevant marketing devices of claim 12, wherein;
a location relevancy score for a marketing device is calculated based, at least in part, on the category of the product and/or service associated with the marketing device data.

18. The system for providing refined location relevant marketing devices of claim 17, wherein;
the category of the product and/or service associated with the marketing device data is determined to be either durable good or non-durable good.

19. The system for providing refined location relevant marketing devices of claim 12, wherein;
a location relevancy score for a marketing device is calculated based, at least in part, on one or more location-enhancing marketing device terms associated with the marketing device data.

20. The system for providing refined location relevant marketing devices of claim 19, wherein;
at least one of the location-enhancing marketing device terms is selected from the group of location-enhancing marketing device terms consisting of at least one of:
free home delivery;
free demo at home; and
free installation.

21. The system for providing refined location relevant marketing devices of claim 12, wherein;
a location relevancy score for a marketing device is calculated based, at least in part, on one or more commute refinement factors associated with the marketing device data.

22. The system for providing refined location relevant marketing devices of claim 21, wherein;
at least one of the commute refinement factors is selected from the group of commute refinement factors consisting of at least one of:
the presence of good public transport connections to the merchant;
shopping area where the merchant is located;
whether or not the consumer is currently at home or work;
the time of day the consumer is making the marketing device request;
the day of the week the consumer is making the marketing device request; and
whether the merchants' locations are at, or near, locations the consumer has historically frequented and/or shopped.

23. A marketing device management system, the marketing device management system including:
a matching engine;
one or more processors associated with the marketing device management system, the one or more processors associated with the marketing device management system implementing the matching engine, the one or more processors associated with the marketing device management system:
obtaining marketing device data, merchant location refinement data, consumer location refinement data, and marketing device request data;
using the marketing device request data to search the marketing device data for marketing devices that initially match the marketing device request data;
using at least part of the marketing device data, the merchant location refinement data, and the consumer location refinement data, to calculate a location relevancy score for each of marketing devices that initially matched the marketing device request data, the location relevancy score being a combination of a plurality of location relevant factors, each modified by respective individual weighting factors, wherein determining the value of at least one location relevant factor includes consideration of expected traffic between the consumer's present position and the merchants' position, further wherein either a first set of weighting factors or a second set of weighting factors is selected based on the type of goods associated with the marketing device, wherein the system is configured so that a category weighting factor associated with physical distance between a consumer and a merchant will be lower than when the type of goods is durable than when the type of goods is nondurable, and a category weighting factor associated with service, delivery charges or installation is greater if the type of goods is durable, than when the type of goods is nondurable; and selecting one or more of the marketing devices that initially matched the marketing device request data to provide to a consumer based, at least in part, on the location relevancy score for each of marketing devices that initially matched the marketing device request data.

24. The marketing device management system of claim 23, wherein;
at least part of the marketing device data is selected from the group of marketing device data consisting of at least one of:
the name of the merchant offering the marketing device;
the products sold by the merchant offering the marketing device;
the services provided by the merchant offering the marketing device;
the products and/or services that are the subject of the marketing device data;
the terms of the marketing device; and
any conditions of the marketing device.

25. The marketing device management system of claim 23, wherein;
at least part of the merchant location refinement data is selected from the group of merchant location refinement data consisting of at least one of:
the name of the merchant and/or the merchant's business;
the location of the merchant and/or the merchant's business;
the products sold by the merchant and/or the merchant's business;
the services provided by the merchant and/or the merchant's business;
all the merchant's location(s);
the merchant's hours of operation;
the merchants' contact information, such as e-mail, web page, social media accounts, phone number;
the merchant's shipping policies;
proximity of the merchant's location to public transportation; and
the merchant's service policies and capabilities.

26. The marketing device management system of claim 23, wherein;
at least part of the consumer location refinement data is selected from the group of consumer location refinement data consisting of at least one of:
the consumer's home address;
the consumer's work address;
the consumer's shopping likes and dislikes;
the consumer's shopping history;
the consumer's age;
the consumer's occupation;
the consumer's sex;
the consumer's marital status and/or number of dependents; and
when and where the consumer prefers to shop.

27. The marketing device management system of claim 23, wherein;
at least part of the consumer location refinement data is obtained from one or more data management systems associated with one or more consumers.

28. The marketing device management system of claim 23, wherein;
a location relevancy score for a marketing device is calculated based, at least in part, on the category of the product and/or service associated with the marketing device data.

29. The marketing device management system of claim 23, wherein;
a location relevancy score for a marketing device is calculated based, at least in part, on one or more location-enhancing marketing device terms associated with the marketing device data.

30. The marketing device management system of claim 29, wherein;
at least one of the location-enhancing marketing device terms is selected from the group of location-enhancing marketing device terms consisting of at least one of:
free home delivery;
free demo at home; and
free installation.

31. The marketing device management system of claim 23, wherein;
a location relevancy score for a marketing device is calculated based, at least in part, on one or more commute refinement factors associated with the marketing device data.

32. The marketing device management system of claim 31, wherein;
at least one of the commute refinement factors is selected from the group of commute refinement factors consisting of at least one of:
the presence of good public transport connections to the merchant;
shopping area where the merchant is located;
whether or not the consumer is currently at home or work;
the time of day the consumer is making the marketing device request;
the day of the week the consumer is making the marketing device request; and
whether the merchants' locations are at, or near, locations the consumer has historically frequented and/or shopped.

* * * * *